US009780635B1

(12) United States Patent
Lam et al.

(10) Patent No.: US 9,780,635 B1
(45) Date of Patent: Oct. 3, 2017

(54) DYNAMIC SHARING AVERAGE CURRENT MODE CONTROL FOR ACTIVE-RESET AND SELF-DRIVEN SYNCHRONOUS RECTIFICATION FOR POWER CONVERTERS

(71) Applicant: Crane Electronics, Inc., Redmond, WA (US)

(72) Inventors: Cuon Lam, Renton, WA (US); Hach Nguyen, Lynnwood, WA (US); Khoa Nguyen, Seattle, WA (US); Peter Odell, Seattle, WA (US); Sovann Song, Bothell, WA (US)

(73) Assignee: Crane Electronics, Inc., Redmond, WA (US)

( * ) Notice: Subject to any disclaimer, the term of this patent is extended or adjusted under 35 U.S.C. 154(b) by 0 days.

(21) Appl. No.: 15/178,968

(22) Filed: Jun. 10, 2016

(51) Int. Cl.
*H02M 3/335* (2006.01)
*H02M 1/00* (2006.01)

(52) U.S. Cl.
CPC ......... *H02M 1/00* (2013.01); *H02M 3/33592* (2013.01); *H02M 3/33538* (2013.01);
(Continued)

(58) Field of Classification Search
CPC ............. H02M 3/1584; H02M 3/1586; H02M 3/1588; H02M 3/335; H02M 3/33507; H02M 3/33523; H02M 3/33538; H02M 3/33546; H02M 3/33553; H02M 3/33569; H02M 3/33576; H02M 3/33592; H02M 3/338; H02M 3/3385; H02M 2001/0064;
(Continued)

(56) References Cited

U.S. PATENT DOCUMENTS 3,144,627 A  8/1964  Dunnabeck et al.
3,201,728 A  8/1965  McWhirter
(Continued)

FOREIGN PATENT DOCUMENTS

CN     2307390 Y     2/1999
CN   101326705 A    12/2008
(Continued)

OTHER PUBLICATIONS

International Search Report and Written Opinion of the International Searching Authority, dated May 31, 2016, for corresponding International Application No. PCT/US2016/018628, 12 pages.
(Continued)

*Primary Examiner* — Timothy J Dole
*Assistant Examiner* — Ivan Laboy Andino
(74) *Attorney, Agent, or Firm* — Seed IP Law Group LLP

(57) ABSTRACT

A circuit for providing dynamic output current sharing using average current mode control for active-reset and self-driven synchronous rectification with pre-bias startup and redundancy capabilities for power converters. The circuit communicates a secondary side feedback signal to a primary side via a bidirectional magnetic communicator that also provides a secondary voltage supply. Pre-bias startup is achieved by detection of the output current direction and controlling the gate signals of synchronous rectifiers. The circuit permits dynamic current sharing via a single-control signal and automatic master converter selection and promotion.

19 Claims, 8 Drawing Sheets

(52) U.S. Cl.
 CPC .... *H02M 3/33546* (2013.01); *H02M 3/33553* (2013.01); *H02M 2001/0009* (2013.01); *H02M 2001/0025* (2013.01)

(58) Field of Classification Search
 CPC ............ Y02B 70/1433; Y02B 70/1458; Y02B 70/1475
 USPC ............. 363/21.01–21.18, 65; 323/271, 272, 323/282–285, 351
 See application file for complete search history.

(56) References Cited

U.S. PATENT DOCUMENTS

| | | | |
|---|---|---|---|
| 3,699,424 A | 10/1972 | Hart et al. | |
| 3,831,080 A | 8/1974 | Zabert et al. | |
| 4,128,868 A | 12/1978 | Gamble | |
| 4,255,784 A | 3/1981 | Rosa | |
| 4,337,569 A | 7/1982 | Pierce | |
| 4,354,162 A | 10/1982 | Wright | |
| 4,482,945 A | 11/1984 | Wolf et al. | |
| 4,533,986 A | 8/1985 | Jones | |
| 4,618,812 A | 10/1986 | Kawakami | |
| 4,635,002 A | 1/1987 | Riebeek | |
| 4,683,527 A | 7/1987 | Rosa | |
| 4,719,552 A | 1/1988 | Albach et al. | |
| 4,743,835 A | 5/1988 | Bossé et al. | |
| 4,813,126 A | 3/1989 | Williamson | |
| 4,814,735 A | 3/1989 | Williamson | |
| 4,833,437 A | 5/1989 | Williamson | |
| 4,837,535 A | 6/1989 | Konishi et al. | |
| 4,920,309 A | 4/1990 | Szepesi | |
| 4,956,626 A | 9/1990 | Hoppe et al. | |
| 4,992,919 A | 2/1991 | Lee et al. | |
| 5,031,066 A | 7/1991 | Wagner et al. | |
| 5,068,774 A | 11/1991 | Rosa | |
| 5,148,357 A | 9/1992 | Paice | |
| 5,329,695 A | 7/1994 | Traskos et al. | |
| 5,343,383 A | 8/1994 | Shinada et al. | |
| 5,396,165 A | 3/1995 | Hwang et al. | |
| 5,418,502 A | 5/1995 | Ma et al. | |
| 5,430,640 A | 7/1995 | Lee | |
| 5,436,550 A | 7/1995 | Arakawa | |
| 5,469,124 A | 11/1995 | O'Donnell et al. | |
| 5,481,225 A | 1/1996 | Lumsden et al. | |
| 5,521,807 A | 5/1996 | Chen et al. | |
| 5,631,822 A | 5/1997 | Silberkleit et al. | |
| 5,638,262 A | 6/1997 | Brown | |
| 5,691,629 A | 11/1997 | Belnap | |
| 5,694,303 A | 12/1997 | Silberkleit et al. | |
| 5,708,571 A | 1/1998 | Shinada | |
| 5,734,563 A | 3/1998 | Shinada | |
| 5,774,347 A | 6/1998 | Nakanishi | |
| 5,777,866 A | 7/1998 | Jacobs et al. | |
| 5,831,418 A | 11/1998 | Kitagawa | |
| 5,903,504 A | 5/1999 | Chevallier et al. | |
| 5,917,716 A | 6/1999 | Cho | |
| 5,963,438 A | 10/1999 | Chen | |
| 6,002,183 A | 12/1999 | Iversen et al. | |
| 6,002,318 A | 12/1999 | Werner et al. | |
| 6,038,148 A | 3/2000 | Farrington et al. | |
| 6,043,705 A | 3/2000 | Jiang | |
| 6,091,616 A | 7/2000 | Jacobs et al. | |
| 6,101,104 A * | 8/2000 | Eng | H02M 1/38 363/127 |
| 6,137,373 A | 10/2000 | Mori | |
| 6,141,232 A | 10/2000 | Weinmeier et al. | |
| 6,157,180 A | 12/2000 | Kuo | |
| 6,157,282 A | 12/2000 | Hopkinson | |
| 6,169,674 B1 | 1/2001 | Owen | |
| 6,191,964 B1 | 2/2001 | Boylan et al. | |
| 6,198,647 B1 | 3/2001 | Zhou et al. | |
| 6,232,832 B1 | 5/2001 | Kirkpatrick, II | |
| 6,236,194 B1 | 5/2001 | Manabe et al. | |
| 6,252,781 B1 | 6/2001 | Rinne et al. | |
| 6,304,463 B1 | 10/2001 | Krugly | |
| 6,335,872 B1 | 1/2002 | Zhou et al. | |
| 6,343,026 B1 | 1/2002 | Perry | |
| 6,456,511 B1 | 9/2002 | Wong | |
| 6,469,478 B1 | 10/2002 | Curtin | |
| 6,472,852 B1 | 10/2002 | Lethellier | |
| 6,492,890 B1 | 12/2002 | Woznlczka | |
| 6,545,534 B1 | 4/2003 | Mehr | |
| 6,563,719 B1 | 5/2003 | Hua | |
| 6,617,948 B2 | 9/2003 | Kuroshima et al. | |
| 6,618,274 B2 | 9/2003 | Boylan et al. | |
| 6,643,151 B1 | 11/2003 | Nebrigic et al. | |
| 6,664,660 B2 | 12/2003 | Tsai | |
| 6,697,955 B1 | 2/2004 | Malik et al. | |
| 6,707,650 B2 | 3/2004 | Diallo et al. | |
| 6,711,039 B2 * | 3/2004 | Brkovic | H02M 3/33592 363/127 |
| 6,734,775 B2 | 5/2004 | Chung | |
| 6,760,235 B2 | 7/2004 | Lin et al. | |
| 6,798,177 B1 | 9/2004 | Liu et al. | |
| 6,839,246 B1 | 1/2005 | Zhang et al. | |
| 6,850,048 B2 | 2/2005 | Orr et al. | |
| 6,998,901 B2 | 2/2006 | Lee | |
| 7,012,413 B1 | 3/2006 | Ye | |
| 7,046,492 B2 | 5/2006 | Fromm et al. | |
| 7,061,212 B2 | 6/2006 | Phadke | |
| 7,095,215 B2 | 8/2006 | Liu et al. | |
| 7,129,808 B2 | 10/2006 | Roebke et al. | |
| 7,164,584 B2 | 1/2007 | Walz | |
| 7,183,727 B2 | 2/2007 | Ferguson et al. | |
| 7,199,563 B2 | 4/2007 | Ikezawa | |
| 7,202,644 B2 | 4/2007 | Nitta et al. | |
| 7,206,210 B2 | 4/2007 | Harnett et al. | |
| 7,212,416 B2 | 5/2007 | Kyono | |
| 7,224,590 B2 * | 5/2007 | Lin | H02M 3/33592 363/21.06 |
| 7,227,754 B2 | 6/2007 | Griesinger et al. | |
| 7,242,168 B2 | 7/2007 | Müller et al. | |
| 7,286,376 B2 | 10/2007 | Yang | |
| 7,304,828 B1 | 12/2007 | Shvartsman | |
| 7,339,804 B2 | 3/2008 | Uchida | |
| 7,369,024 B2 | 5/2008 | Yargole et al. | |
| 7,443,278 B2 | 10/2008 | Kawahata et al. | |
| 7,515,005 B2 | 4/2009 | Dan | |
| 7,564,706 B1 | 7/2009 | Herbert | |
| 7,577,539 B2 | 8/2009 | Hubanks et al. | |
| 7,579,901 B2 | 8/2009 | Yamashita | |
| 7,602,273 B2 | 10/2009 | Yoshikawa | |
| 7,616,459 B2 | 11/2009 | Huynh et al. | |
| 7,616,464 B2 * | 11/2009 | Phadke | H02M 3/33576 323/285 |
| 7,663,896 B2 | 2/2010 | Na | |
| 7,730,981 B2 | 6/2010 | McCabe et al. | |
| 7,742,318 B2 | 6/2010 | Fu et al. | |
| 7,773,392 B2 * | 8/2010 | Matsumoto | H02M 3/33592 363/21.07 |
| 7,786,712 B2 | 8/2010 | Williams | |
| 7,847,519 B2 | 12/2010 | Ho | |
| 7,884,317 B2 | 2/2011 | Casper | |
| 7,893,804 B2 | 2/2011 | Kaveh Ahangar et al. | |
| 7,933,131 B2 | 4/2011 | Cho et al. | |
| 8,009,004 B2 | 8/2011 | Ahangar et al. | |
| 8,040,699 B2 | 10/2011 | Huynh et al. | |
| 8,067,992 B2 | 11/2011 | Chen et al. | |
| 8,072,195 B2 | 12/2011 | Aan De Stegge et al. | |
| 8,102,162 B2 | 1/2012 | Moussaoui et al. | |
| 8,233,293 B2 * | 7/2012 | Selvaraju | H02M 3/33592 323/272 |
| 8,279,631 B2 | 10/2012 | Yang | |
| 8,350,659 B2 | 1/2013 | Dziubek et al. | |
| 8,358,118 B2 | 1/2013 | Chen et al. | |
| 8,373,403 B1 | 2/2013 | Radovic | |
| 8,378,647 B2 | 2/2013 | Yonezawa et al. | |
| 8,508,195 B2 | 8/2013 | Uno | |
| 8,520,415 B1 | 8/2013 | Krishnamoorthy et al. | |
| 8,552,589 B2 | 10/2013 | Ghosh et al. | |
| 8,570,006 B2 | 10/2013 | Moussaoui et al. | |
| 8,649,128 B2 | 2/2014 | Wang et al. | |
| 8,710,820 B2 | 4/2014 | Parker | |
| 8,736,240 B2 | 5/2014 | Liu et al. | |

(56) References Cited

U.S. PATENT DOCUMENTS

| | | |
|---|---|---|
| 8,760,082 B2 | 6/2014 | Yang et al. |
| 8,764,247 B2 | 7/2014 | Pattekar et al. |
| 8,810,214 B2 | 8/2014 | Van Dijk et al. |
| 8,824,167 B2 | 9/2014 | Hughes et al. |
| 8,829,868 B2 | 9/2014 | Waltman et al. |
| 8,866,551 B2 | 10/2014 | Lam et al. |
| 8,873,263 B2 | 10/2014 | Feng et al. |
| 8,885,308 B2 | 11/2014 | Waltman et al. |
| 8,890,630 B2 | 11/2014 | Hughes |
| 9,030,178 B2 | 5/2015 | Chang et al. |
| 9,041,378 B1 | 5/2015 | Lam et al. |
| 9,106,142 B2 | 8/2015 | Huang et al. |
| 9,160,228 B1 | 10/2015 | Parker et al. |
| 9,230,726 B1 | 1/2016 | Parker et al. |
| 9,293,999 B1 | 3/2016 | Lam et al. |
| 2002/0000796 A1* | 1/2002 | Popescu ............... H02M 1/40 323/276 |
| 2002/0015320 A1 | 2/2002 | Mochikawa et al. |
| 2002/0071300 A1 | 6/2002 | Jang et al. |
| 2002/0085402 A1* | 7/2002 | Zhang ............. H02M 3/33592 363/127 |
| 2004/0125523 A1 | 7/2004 | Edwards et al. |
| 2004/0169498 A1 | 9/2004 | Goder et al. |
| 2004/0178776 A1 | 9/2004 | Hansen et al. |
| 2004/0178846 A1 | 9/2004 | Kuyel et al. |
| 2006/0039172 A1 | 2/2006 | Soldano |
| 2006/0132105 A1 | 6/2006 | Prasad et al. |
| 2006/0132272 A1 | 6/2006 | Kitahara et al. |
| 2006/0212138 A1 | 9/2006 | Zhang |
| 2006/0220629 A1 | 10/2006 | Saito et al. |
| 2006/0227582 A1 | 10/2006 | Wei et al. |
| 2007/0152644 A1 | 7/2007 | Vinn |
| 2007/0257733 A1 | 11/2007 | Laletin |
| 2008/0024951 A1 | 1/2008 | Mortensen et al. |
| 2008/0031014 A1 | 2/2008 | Young |
| 2008/0049456 A1* | 2/2008 | Moromizato ..... H02M 3/33592 363/21.06 |
| 2008/0150670 A1 | 6/2008 | Chung et al. |
| 2008/0174396 A1 | 7/2008 | Choi et al. |
| 2008/0186121 A1 | 8/2008 | Kawahata et al. |
| 2008/0197724 A1 | 8/2008 | Cullen et al. |
| 2008/0303606 A1 | 12/2008 | Liu et al. |
| 2009/0067206 A1 | 3/2009 | Oguchi et al. |
| 2009/0128110 A1 | 5/2009 | DeLurio et al. |
| 2009/0154204 A1 | 6/2009 | Taylor |
| 2009/0167432 A1 | 7/2009 | van den Heuvel |
| 2009/0174381 A1 | 7/2009 | Ojanen et al. |
| 2009/0231029 A1 | 9/2009 | Randlett |
| 2009/0237057 A1 | 9/2009 | Dishman et al. |
| 2009/0256547 A1 | 10/2009 | Akyildiz et al. |
| 2009/0273431 A1 | 11/2009 | Hurst |
| 2009/0302775 A1 | 12/2009 | Alexandrov |
| 2009/0321045 A1 | 12/2009 | Hernon et al. |
| 2009/0321046 A1 | 12/2009 | Hernon et al. |
| 2010/0008112 A1 | 1/2010 | Feng et al. |
| 2010/0014330 A1 | 1/2010 | Chang et al. |
| 2010/0117715 A1 | 5/2010 | Ariyama |
| 2010/0176755 A1 | 7/2010 | Hoadley et al. |
| 2010/0253309 A1 | 10/2010 | Xi et al. |
| 2011/0090038 A1 | 4/2011 | Perchlik |
| 2011/0103105 A1 | 5/2011 | Wei et al. |
| 2011/0169471 A1 | 7/2011 | Nagasawa |
| 2012/0268227 A1 | 10/2012 | Howes et al. |
| 2013/0021008 A1 | 1/2013 | Hume et al. |
| 2013/0049918 A1 | 2/2013 | Fu et al. |
| 2013/0121043 A1 | 5/2013 | Pietkiewicz |
| 2013/0201631 A1 | 8/2013 | Parker et al. |
| 2013/0245854 A1 | 9/2013 | Rinne et al. |
| 2013/0299148 A1 | 11/2013 | Hernon et al. |
| 2014/0015629 A1 | 1/2014 | Zeng et al. |
| 2014/0016356 A1 | 1/2014 | Furmanczyk et al. |
| 2014/0118946 A1 | 5/2014 | Tong et al. |
| 2014/0192561 A1 | 7/2014 | Plesnik |
| 2014/0292288 A1 | 10/2014 | Yan et al. |
| 2014/0327417 A1 | 11/2014 | Zhu et al. |
| 2015/0137412 A1 | 5/2015 | Schalansky |
| 2015/0229149 A1 | 8/2015 | Fahlenkamp et al. |
| 2016/0261194 A1 | 9/2016 | Lam et al. |

FOREIGN PATENT DOCUMENTS

| | | |
|---|---|---|
| CN | 201219235 Y | 4/2009 |
| CN | 102582997 A | 2/2014 |
| CN | 104704742 A | 6/2015 |
| EP | 1 933 340 A1 | 6/2008 |
| GB | 1071469 A | 6/1967 |
| GB | 1114013 A | 5/1968 |
| JP | 55-1761 A | 1/1980 |
| JP | 55-130208 A | 10/1980 |
| JP | 62-32714 A | 2/1987 |
| JP | 2567069 B2 | 6/1993 |
| JP | 8-78252 A | 3/1996 |
| JP | 2001-320250 A | 11/2001 |
| JP | 2002-76799 A | 3/2002 |
| JP | 2003-173913 A | 6/2003 |
| JP | 2007-215359 A | 8/2007 |
| JP | 2007-263944 A | 10/2007 |
| JP | 2008-185389 A | 8/2008 |
| JP | 2009-100120 A | 5/2009 |
| JP | 2009-106012 A | 5/2009 |
| JP | 5030216 B2 | 9/2012 |
| KR | 10-2007-0118409 A | 12/2007 |
| KR | 10-2008-0019196 A | 3/2008 |
| KR | 10-2008-0101784 A | 11/2008 |
| KR | 10-2013-0026714 A | 3/2013 |
| WO | 99/41957 A1 | 8/1999 |
| WO | 01/22444 A1 | 3/2001 |
| WO | 02/097974 A2 | 12/2002 |
| WO | 2011/123680 A2 | 10/2011 |
| WO | 2012/100810 A1 | 8/2012 |
| WO | 2012/116263 A1 | 8/2012 |
| WO | 2014/039982 A1 | 3/2014 |
| WO | 2014/103298 A1 | 7/2014 |
| WO | 2017/015143 A1 | 1/2017 |

OTHER PUBLICATIONS

International Search Report and Written Opinion of the International Searching Authority, dated Jun. 21, 2016, for corresponding International Application No. PCT/US2016/019520, 14 pages.
"Application Guide: Theory of Operation," MicroPower Direct, retrieved from http://micropowerdirect.com/PDF%20Filed/Application%20Notes/Power%20Supply%20Theory%20of%20Operation.pdf on Apr. 18, 2012, 6 pages.
"Buck converter," retrieved from http://en.wikipedia.org/wiki/Buck_converter, on Jun. 23, 2011, 14 pages.
"EMI Suppression Filters (EMIFIL®) for AC Power Lines," Murata Manufacturing Co., Ltd., Cat.No. 009E-14, downloaded on Feb. 21, 2014, 27 pages.
"Maximum Flexible Power (MFP) Single Output Point of Load: Technical Preview—3-6 VDC IN, 7 AMP, Non-Isolated DC/DC Converter," Crane Aerospace & Electronics Power Solutions, 2010, 17 pages.
"Step-gap "E" core swing chokes: Improved regulation and higher efficiency are possible when operating at minimum current levels," Technical Bulletin: Bulletin FC-S4, Magnetics Division, Spang & Company, Butler, Pennsylvania, 2001, 4 pages.
"Synchronous Rectification Aids Low-Voltage Power Supplies," Maxim Integrated Products, retrieved from http://www.maxim-ic.com/app-notes/index.mvp/id/652, on Jun. 22, 2011, 6 pages.
"Application Note 664 Feedback Isolation Augments Power-Supply Safety and Performance," Maxim Integrated, Jan. 22, 2001, retrieved from https://www.maximintegrated.com/en/app-notes/index.mvp/id/664, 6 pages.
Beta Dyne, "Synchronous Rectification," Application Note DC-006, DC/DC Converters, 2002, 3 pages.
Bottrill, "The Effects of Turning off a Converter with Self-Driven Synchronous Rectifiers," Power Guru, May 1, 2007, retrieved from http://www.powerguru.org/the-effects-of-turning-off-a-converter-with-self-driven-synchronous-rectifiers/ Jul. 10, 2015, 6 pages.

(56) References Cited

OTHER PUBLICATIONS

Chinese Office Action with English Translation dated May 22, 2015, for corresponding CN Application No. 201280016631.1, 15 pages.

Coates, "Power supplies—3.0 Switched Mode Power Supplies," www.learnabout-electronics.org, 2007-2013, 20 pages.

Cuon et al., "Dynamic Maneuvering Configuration of Multiple Control Modes in a Unified Servo System," Amendment filed Mar. 6, 2015, for U.S. Appl. No. 14/333,705, 11 pages.

Dixon, "Unitrode Application Note Average Current Mode Control of Switching Power Supplies," Texas Instruments Inc., 1999.

eCircuit Center, "Op Amp Input Offset Adjustment," 2002, retrieved from http://www.ecircuitcenter.com/Circuits/op_vofflop_voff2.htm on Mar. 26, 2012, 3 pages.

Extended European Search Report, dated Apr. 15, 2016 for corresponding European Application No. 13835620.9, 7 pages.

Furmanczyk et al., "AC/DC Power Conversion System and Method of Manufacture of the Same," Notice of Allowance, dated Apr. 25, 2016, for U.S. Appl. No. 14/001,312, 9 pages.

Hughes et al., "Self Synchronizing Power Converter Apparatus and Method Suitable for Auxiliary Bias for Dynamic Load Applications," Notice of Allowance dated May 14, 2014, for U.S. Appl. No. 13/185,217, 10 pages.

Hughes, "Oscillator Apparatus and Method With Wide Adjustable Frequency Range," Office Action dated Jun. 5, 2013, for U.S. Appl. No. 13/185,152, 17 pages.

Hughes, "Oscillator Apparatus and Method With Wide Adjustable Frequency Range," Amendment filed Oct. 7, 2013, for U.S. Appl. No. 13/185,152, 15 pages.

Hughes, "Oscillator Apparatus and Method With Wide Adjustable Frequency Range," Office Action dated Jan. 28, 2014, for U.S. Appl. No. 13/185,152, 15 pages.

Hughes, "Oscillator Apparatus and Method With Wide Adjustable Frequency Range," Amendment filed Apr. 24, 2014, for U.S. Appl. No. 13/185,152, 8 pages.

Hughes, "Oscillator Apparatus and Method With Wide Adjustable Frequency Range," Notice of Allowance dated Jul. 14, 2014, for U.S. Appl. No. 13/185,152, 12 pages.

Hume et al., "Power Converter Apparatus and Method With Compensation for Light Load Conditions," Office Action dated Nov. 6, 2013, for U.S. Appl. No. 13/185,142, 11 pages.

International Search Report and Written Opinion of the International Searching Authority, dated Aug. 31, 2015 for corresponding International Application No. PCT/US2015/033321, 9 pages.

International Search Report, dated Dec. 20, 2013, for corresponding International Application No. PCT/US2013/058784, 3 pages.

International Search Report, dated Oct. 14, 2011, for corresponding International Application No. PCT/US2011/030778, 3 pages.

Irving et al., "Analysis and Design Optimization of Magnetic-Feedback Control Using Amplitude Modulation," *IEEE Transactions on Power Electronics* 24(2):426-433, Feb. 2009.

Jovanović et al., "Design Considerations for Forward Converter with Synchronous Rectifiers," Power Conversion Proceedings, pp. 340-350, Oct. 1993.

King et al., "Active Clamp Control Boosts Forward Converter Efficiency," Power Electronics Technology, pp. 52-55, Jun. 2003.

Kristjansson et al., "Solutions to Today's Low Voltage Power Design Challenges Using High-Efficiency, Non-Isolated Point of Load Converters: A Discussion of the Interpoint™ MFP Series™ Point of Load Converter," Crane Aerospace & Electronics, Power Solutions—Interpoint Products, Redmond, WA, Oct. 2011, Revised Jan. 2012, 25 pages.

Lam et al., "Automatic Enhanced Self-Driven Synchronous Rectification for Power Converters," Notice of Allowance, for U.S. Appl. No. 14/848,859, dated Dec. 10, 2015, 29 pages.

Lam et al., "Automatic Enhanced Self-Driven Synchronous Rectification for Power Converters for Wide Input Range and High Output Voltage Without Tertiary Winding," U.S. Appl. No. 62/193,755, filed Jul. 17, 2015, 53 pages.

Lam et al., "Dynamic Maneuvering Configuration for Multiple Control Modes in a Unified Servo System," Office Action dated Dec. 23, 2014, for U.S. Appl. No. 14/333,705, 6 pages.

Lam et al., "Impedance Compensation for Operational Amplifiers Used in Variable Environments," Office Action dated Feb. 7, 2014, for U.S. Appl. No. 13/609,107, 11 pages.

Lam et al., "Impedance Compensation for Operational Amplifiers Used in Variable Environments," Amendment filed May 6, 2014, for U.S. Appl. No. 13/609,107, 12 pages.

Lam et al., "Impedance Compensation for Operational Amplifiers Used in Variable Environments," Notice of Allowance dated Jun. 27, 2014, for U.S. Appl. No. 13/609,107, 9 pages.

Manfredi et al., "Additive Manufacturing of Al Alloys and Aluminium Matrix Composites (AMCs)," in Monteiro (ed.), *Light Metal Alloys Applications*, InTech, Jun. 11, 2014, 32 pages.

Mappus, "Synchronous Rectification for Forward Converters," Fairchild Semiconductor Power Seminar 2010-2011, 19 pages.

Merriam-Webster, "Directly," retrieved from http://www.merriam-webster.com/dictionary/directly, on Nov. 6, 2012, 1 pages.

Mitsuya, "Basics of Noise Countermeasures—Lesson 14: Using Common Mode Choke Coils for Power Supply Lines," Murata Manufacturing Co., Ltd., Oct. 28, 2014, retrieved on Feb. 4, 2015, from http://www.murata.com/en-eu/products/emiconfun/emc/2014/10/28/en-20141028-p1, 3 pages.

Ng, "Implementing Constant Current Constant Voltage AC Adapter by NCP1200 and NCP4300A," Application Note, Publication Order No. AND8042/D, Semiconductor Components Industries, Feb. 2001, 12 pages.

Nguyen et al., "Nulling Input Offset Voltage of Operational Amplifiers," Mixed Signal Products, Texas Instruments—Application Report SLOA045, Aug. 2000, pp. 1-15.

Notice for Reasons for Rejections from the Japanese Patent Office with English Translation, dated Apr. 18, 2016, for corresponding Japanese Application No. 2015-531290, 5 pages.

Ou et al., "Magnetic Feedback Ranks High in Military Converters," *Power Electronics Technology*:Jul. 14-19, 2005.

Parker et al., "Integrated Tri-State Electromagnetic Interference Filter and Line Conditioning Module," Office Action dated Apr. 24, 2015, for U.S. Appl. No. 14/632,818, 11 pages.

Parker et al., "Transformer-Based Power Converters With 3D Printed Microchannel Heat Sink," Office Action dated Apr. 16, 2015, for U.S. Appl. No. 14/627,556, 9 pages.

Parker, "Switched Capacitor Hold-Up Scheme for Constant Boost Output Voltage," Office Action dated Mar. 28, 2012, for U.S. Appl. No. 12/751,067, 16 pages.

Parker, "Switched Capacitor Hold-Up Scheme for Constant Boost Output Voltage," Amendment filed Jul. 30, 2012, for U.S. Appl. No. 12/751,067, 18 pages.

Parker, "Switched Capacitor Hold-Up Scheme for Constant Boost Output Voltage," Office Action dated Nov. 16, 2012, for U.S. Appl. No. 12/751,067, 20 pages.

Parker, "Switched Capacitor Hold-Up Scheme for Constant Boost Output Voltage," Amendment filed Jan. 16, 2013, for U.S. Appl. No. 12/751,067, 15 pages.

Parker, "Switched Capacitor Hold-Up Scheme for Constant Boost Output Voltage," Amendment filed Feb. 15, 2013, for U.S. Appl. No. 12/751,067, 15 pages.

Parker, "Switched Capacitor Hold-Up Scheme for Constant Boost Output Voltage," Office Action dated Jul. 30, 2013, for U.S. Appl. No. 12/751,067, 18 pages.

Parker, "Switched Capacitor Hold-Up Scheme for Constant Boost Output Voltage," Amendment filed Oct. 30, 2013, for U.S. Appl. No. 12/751,067, 19 pages.

Parker, "Switched Capacitor Hold-Up Scheme for Constant Boost Output Voltage," Notice of Allowance dated Feb. 3, 2014, for U.S. Appl. No. 12/751,067, 11 pages.

Parker, "Transformer-Based Power Converters With 3D Printed Microchannel Heat Sink," Office Action, dated Aug. 3, 2015, for U.S. Appl. No. 14/627,556, 11 pages.

Pascu, "Error Amplifier with Forced Equilibrium Adaptor," Kepco, Inc., retrieved from http://www.kepcopower.com/equibm2.htm#fig2, dated May 22, 2014, 8 pages.

(56) References Cited

OTHER PUBLICATIONS

Peter, "Synchronous rectifier in DC/DC converters," Oct. 5, 2009, retrieved from http://www.posterus.sk/?p=2535, on Jul. 10, 2015, 11 pages.
Plesnik, "A New Method for Driving Synchronous Rectifiers," IEICE/IEEE INTELEC'03, Oct. 19-23, Yokohama, Japan, pp. 274-281, 2003.
Shrisavar, "Introduction to Power Management," Texas Instruments, Biracha Digital Power Ltd., 2014, 37 pages.
Waltman et al., "Input Control Apparatus and Method With Inrush Current, Under and Over Voltage Handling," Office Action dated Jun. 17, 2014, for U.S. Appl. No. 13/185,210, 8 pages.
Waltman et al., "Power Converter Apparatus and Method With Compensation for Current Limit/Current Share Operation," Office Action dated Dec. 17, 2013, for U.S. Appl. No. 13/185,172, 15 pages.
Waltman et al., "Power Converter Apparatus and Method With Compensation for Current Limit/Current Share Operation," Amendment filed Mar. 17, 2014, for U.S. Appl. No. 13/185,172, 16 pages.
Waltman et al., "Power Converter Apparatus and Method With Compensation for Current Limit/Current Share Operation," Notice of Allowance dated May 8, 2014, for U.S. Appl. No. 13/185,172, 10 pages.
Waltman et al., "Power Converter Apparatus and Methods," U.S. Appl. No. 61/508,937, filed Jul. 18, 2011, 139 pages.
Written Opinion of the International Searching Authority, dated Oct. 14, 2011, for corresponding PCT/US2011/030778, 5 pages.
Written Opinion of the International Searching Authority, dated Dec. 20, 2013, for corresponding PCT/US2013/058784, 4 pages.
Xing et al., "Power System Architecture with Back-Up Power for Servers," ERC Program of the National Science Foundation, 5 pages. (the year of publication is sufficiently earlier than the effective U.S. filed and any foreign priority date so that the particular month of publication is not in issue.).
Zhang, "Chapter Two Synchronous Rectification," Synchronous Rectification, pp. 9-72, PDF created Feb. 20, 1997.
International Search Report and Written Opinion, dated Oct. 12, 2016, for corresponding International Application No. PCT/US2016/042582, 11 pages.
International Search Report, dated Aug. 12, 2002, for PCT/US01/50033, 1 pages.
International Search Report, dated Jun. 8, 2011, for PCT/US2010/052705, 3 pages.
International Search Report, dated Jun. 8, 2011, for PCT/US2010/052707, 3 pages.
Kuehny et al., "Output Filter for Use With Power Converters, for Example DC/DC Power Converters, for Instance Interpoint MFP POL DC/DC Power Converters," U.S. Appl. No. 61/547,327, filed Oct. 14, 2011, 14 pages.
Lam et al., "Proactively Operational Over-Voltage Protection Circuit," U.S. Appl. No. 15/374,116, filed Dec. 9, 2016, 32 pages.
Lam et al., "Proactively Operational Over-Voltage Protection Circuit," U.S. Appl. No. 15/376,329, filed Dec. 12, 2016, 32 pages.

\* cited by examiner

DYNAMIC SHARING AVERAGE CURRENT MODE CONTROL FOR ACTIVE-RESET AND SELF-DRIVEN SYNCHRONOUS RECTIFICATION FOR POWER CONVERTERS

BACKGROUND

Technical Field

The present disclosure generally relates to power converters.

Description of the Related Art

DC/DC converters are a type of power supply which converts an input DC voltage to a different output DC voltage. Such converters typically include a transformer that is electrically coupled via a switching circuit between a voltage source and a load. Converters known as forward converters include a main switch connected between the voltage source and the primary winding of the transformer to provide forward power transfer to the secondary winding of the transformer when the switch is on and conducting. A metal oxide semiconductor field effect transistor (MOSFET) device is typically used for the switch.

Power converter designs are often constrained by various requirements, such as efficiency, input voltage range, output voltage, power density, and footprint area. These constraints require certain performance tradeoffs. For instance, achieving higher efficiencies may require a more narrow input voltage range. To further improve efficiencies, active-reset schemes and synchronous rectifications are often employed. These synchronous rectification schemes can either be active-control or self-driven.

A limitation of forward converters is that it may be necessary to reset the transformer core to prevent saturation (i.e., discharge the magnetizing current of the transformer during the off period of the main switch). This limitation results from the unipolar character of the transformer core excitation. Techniques exist for resetting the transformer of a forward converter. One such technique is to include a resistor-capacitor-diode (RCD) network in parallel with the primary winding. The RCD network clamps the voltage on the switch to the minimal peak voltage consistent with a given source voltage and switch duty cycle, thereby eliminating the need for dead time while allowing for a wide range of duty cycles. This tends to reduce the voltage stress applied to the switch. Nevertheless, this transformer resetting technique reduces the efficiency of the converter due to the dissipation of the magnetizing energy accumulated in the transformer during the on period of the switch. Instead of being recycled, this magnetizing energy is partially converted into heat by the RCD network.

Another method of transformer resetting is to use a series connection of a capacitor and an auxiliary switch connected across the transformer winding either on the primary side or on the secondary side (referred to as an "active clamp" or "active reset"). When the main switch is turned off, the auxiliary switch is turned on, and vice versa. Thus, magnetizing energy in the transformer is transferred to the clamping capacitor, and the clamping capacitor resonates with the magnetizing inductance to maintain the necessary level of reset voltage. This active clamp reset provides non-dissipative reset of the transformer and minimal voltage stress on the main switch under steady state conditions as dead time is almost zero. For this reason, the active clamp method is compatible with self-driven synchronous rectification.

In switching power supply circuits employing synchronous rectifiers, the diodes are replaced by power transistors to obtain a lower on-state voltage drop. The synchronous rectifier generally uses n-channel MOSFETs rather than diodes to avoid the turn-on voltage drop of diodes which can be significant for low output voltage power supplies. The transistors are biased to conduct when a diode would have been conducting from anode to cathode, and conversely, are gated to block current when a diode would have been blocking from cathode to anode. Although MOSFETs usually serve this purpose, bipolar transistors and other active semiconductor switches may also be suitable.

In these synchronous rectifier circuits, the gate signals can be self-driven, i.e., the gate signal can be tied to the power circuit, or controlled-driven, i.e., the gate signal is derived from some point in the circuit and goes through some active processing circuit before being fed to the MOSFET gate driver. In a power converter, the synchronous rectifier which conducts during the non-conducting period of the main power switch (switches) may be referred to as a freewheeling or "catch" synchronous rectifier. The synchronous rectifier which conducts during the conducting period of the main power switch (switches) may be referred to as a forward synchronous rectifier.

In some applications, when a power converter is first turned on, a pre-existing voltage may exist at the output terminal. Such pre-existing voltage may be referred to as a pre-bias voltage, pre-charge voltage, reverse bias or back bias. This pre-bias voltage may result from an external voltage source (e.g., a load, another power converter), or may exist as a residual charge across one or more output capacitors of the power converter. As noted above, when synchronous rectifiers are used instead of diodes, such rectifiers (e.g., MOSFETs) allow current to flow through the switch in either direction. Thus, under some operating conditions, such as pre-bias startup, operation of the output switches may allow a reverse current to flow from the output terminal of the power converter to ground through an output inductor of the power converter. That is, in such instances the power converter acts as a current sink rather than a current source. Among other things, such undesirable operation may cause the output voltage to drop and may disturb or damage one or more components of the power converter.

BRIEF SUMMARY

An average current mode control (ACMC) controller for a power converter, the power converter including a power transformer having a primary winding electrically coupleable to an input voltage node and a secondary winding electrically coupleable to an output voltage node, a primary control circuit electrically coupled to the primary winding, a secondary control circuit electrically coupled to the secondary winding, the secondary control circuit including first and second synchronous rectifying elements including respective first and second control nodes, may be summarized as including a magnetic communicator circuit including a selectively controllable switch; and a coupling transformer including a first primary winding, a second primary winding, and a secondary winding, the secondary winding electrically coupled to a secondary side DC voltage supply circuit including a DC supply rectifier and a DC supply capacitor which provides a secondary side DC voltage supply on the DC supply capacitor of the secondary side DC voltage supply circuit, the first and second primary windings selectively coupled to a primary side DC voltage supply via the controllable switch whereby the secondary side DC voltage supply is developed on the DC supply capacitor of the secondary side DC voltage supply circuit by selectively controlling the controllable switch into conduction, the secondary winding electrically coupled to a secondary side feedback signal node, and the second primary winding electrically coupled to a sampling circuit including a sampling rectifier and a sampling capacitor whereby a secondary side feedback signal at the secondary side feedback signal node is transferred to the second primary winding by the selective controlling of the controllable switch into conduction, whereby a primary side feedback voltage is developed on the sampling capacitor of the sampling circuit by the selective controlling of the controllable switch into conduction, the primary side feedback voltage electrically coupleable to the primary control circuit of the power converter.

The ACMC controller may further include a voltage error amplifier circuit including an input node and an output node, the input node electrically coupled to the output voltage node of the power converter; and a current error amplifier circuit including an input node and an output node, the input node of the current error amplifier circuit electrically coupled to the output node of the voltage error amplifier circuit, and the output node of the current error amplifier electrically coupled to the secondary side feedback signal node. The voltage error amplifier circuit may include an operational amplifier which may include a supply input node electrically coupled to the secondary side DC voltage supply to receive power therefrom. The current error amplifier circuit may include an operational amplifier which may include a supply input node electrically coupled to the secondary side DC voltage supply to receive power therefrom.

The ACMC controller may further include a common control node which is representative of an output signal of the voltage error amplifier circuit, the common control node coupleable to a common control node of another power converter to provide current sharing operation between the power converter and the other power converter.

The ACMC controller may further include a current direction detector circuit operatively coupled to sense a direction of an output current of the power converter and, responsive to detecting output current flows into the power converter, the current direction detector circuit causes the first and second control nodes of the respective first and second synchronous rectifying elements to control the first and second synchronous rectifying elements to be in an non-conduction state. The current direction detector circuit may include a comparator which may include a supply input node electrically coupled to the secondary side DC voltage supply to receive power therefrom. The current direction detector circuit may include a control switch electrically coupled to each of the first and second control nodes of the respective first and second synchronous rectifying elements, the control switch including a control switch control node electrically coupled to the output voltage node of the power converter. The current direction detector may include a control switch electrically coupled to each of the first and second control nodes of the respective first and second synchronous rectifying elements via respective first and second diodes, the control switch including a control switch control node electrically coupled to the output voltage node of the power converter via a resistor.

An active-clamp forward converter may be summarized as including a transformer having a primary winding and a secondary winding, the secondary winding electrically coupleable to an output voltage node; a primary circuit electrically coupled to the primary winding, the primary winding electrically coupleable to an input voltage node; a secondary circuit electrically coupled to the secondary winding, the secondary circuit including first and second synchronous rectifying elements including respective first and second control nodes; and an average current mode control (ACMC) converter, including a magnetic communicator circuit including a selectively controllable switch; and a coupling transformer including a first primary winding, a second primary winding, and a secondary winding, the secondary winding electrically coupled to a secondary side DC voltage supply circuit including a DC supply rectifier and a DC supply capacitor which provides a secondary side DC voltage supply on the DC supply capacitor of the secondary side DC voltage supply circuit, the first and second primary windings selectively coupled to a primary side DC voltage supply via the controllable switch whereby the secondary side DC voltage supply is developed on the DC supply capacitor of the secondary side DC voltage supply circuit by selectively controlling the controllable switch into conduction, the secondary winding electrically coupled to a secondary side feedback signal node, and the second primary winding electrically coupled to a sampling circuit including a sampling rectifier and a sampling capacitor whereby a secondary side feedback signal at the secondary side feedback signal node is transferred to the second primary winding by the selective controlling of the controllable switch into conduction, whereby a primary side feedback voltage is developed on the sampling capacitor of the sampling circuit by the selective controlling of the controllable switch into conduction, the primary side feedback voltage electrically coupleable to the primary control circuit of the forward converter.

The active-clamp forward converter may further include a voltage error amplifier circuit including an input node and an output node, the input node electrically coupled to the output voltage node of the forward converter; and a current error amplifier circuit including an input node and an output node, the input node of the current error amplifier electrically coupled to the output node of the voltage error amplifier circuit, and the output node of the current error amplifier electrically coupled to the secondary side feedback signal node. The voltage error amplifier circuit may include an operational amplifier which may include a supply input node electrically coupled to the secondary side DC voltage supply to receive power therefrom. The current error amplifier circuit may include an operational amplifier which may include a supply input node electrically coupled to the secondary side DC voltage supply to receive power therefrom.

The active-clamp forward converter may further include a common control node which is representative of an output signal of the voltage error amplifier circuit, the common control node coupleable to a common control node of another forward converter to provide current sharing operation between the forward converter and the other forward converter.

The active-clamp forward converter may further include a current direction detector circuit operatively coupled to sense a direction of an output current of the forward converter and, responsive to detecting output current flows into the forward converter, the current direction detector circuit causes the first and second control nodes of the respective first and second synchronous rectifying elements to control the first and second synchronous rectifying elements to be in an non-conduction state. The current direction detector circuit may include a comparator which may include a supply input node electrically coupled to the secondary side DC voltage supply to receive power therefrom. The current direction detector may include a control switch electrically coupled to each of the first and second control nodes of the respective first and second synchronous rectifying elements, the control switch including a control switch control node electrically coupled to the output voltage node of the forward converter. The current direction detector may include a control switch electrically coupled to each of the first and second control nodes of the respective first and second synchronous rectifying elements via respective first and second diodes, the control switch including a control switch control node electrically coupled to the output voltage node of the forward converter via a resistor.

An average current mode control (ACMC) controller for a power converter, the power converter including a power transformer having a primary winding electrically coupleable to an input voltage node and a secondary winding electrically coupleable to an output voltage node, a primary control circuit electrically coupled to the primary winding, a secondary control circuit electrically coupled to the secondary winding, the secondary control circuit including first and second synchronous rectifying elements including respective first and second control nodes, may be summarized as including a voltage error amplifier circuit including an input node and an output node, the input node electrically coupled to the output voltage node of the power converter; a current error amplifier circuit including an input node and an output node, the input node of the current error amplifier electrically coupled to the output node of the voltage error amplifier circuit, and the output node of the current error amplifier electrically coupled to a secondary side feedback signal node; and a current direction detector circuit operatively coupled to sense a direction of an output current of the power converter and, responsive to detecting output current flows into the power converter, the current direction detector circuit causes the first and second control nodes of the respective first and second synchronous rectifying elements to control the first and second synchronous rectifying elements to be in an non-conduction state. The current direction detector circuit may include a comparator which may include a supply input node electrically coupled to a secondary side DC voltage supply circuit to receive power therefrom. The current direction detector may include a control switch electrically coupled to each of the first and second control nodes of the respective first and second synchronous rectifying elements, the control switch including a control switch control node electrically coupled to the output voltage node of the power converter.

The ACMC controller may further include a magnetic communicator circuit including a selectively controllable switch; and a coupling transformer including a first primary winding, a second primary winding, and a secondary winding, the secondary winding electrically coupled to a secondary side DC voltage supply circuit including a DC supply rectifier and a DC supply capacitor which provides a secondary side DC voltage supply on the DC supply capacitor of the secondary side DC voltage supply circuit, the first and second primary windings selectively coupled to a primary side DC voltage supply via the controllable switch whereby the secondary side DC voltage supply is developed on the DC supply capacitor of the secondary side DC voltage supply circuit by selectively controlling the controllable switch into conduction, the secondary winding electrically coupled to the secondary side feedback signal node, and the second primary winding electrically coupled to a sampling circuit including a sampling rectifier and a sampling capacitor whereby a secondary side feedback signal at the secondary side feedback signal node is transferred to the second primary winding by the selective controlling of the controllable switch into conduction, whereby a primary side feedback voltage is developed on the sampling capacitor of the sampling circuit by the selective controlling of the controllable switch into conduction, the primary side feedback voltage electrically coupleable to the primary control circuit of the power converter. The current direction detector may include a control switch electrically coupled to each of the first and second control nodes of the respective first and second synchronous rectifying elements via respective first and second diodes, the control switch including a control switch control node electrically coupled to the output voltage node of the power converter via a resistor.

The ACMC controller may further include a common control node which is representative of an output signal of the voltage error amplifier circuit, the common control node coupleable to a common control node of another power converter to provide current sharing operation between the power converter and the other power converter.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
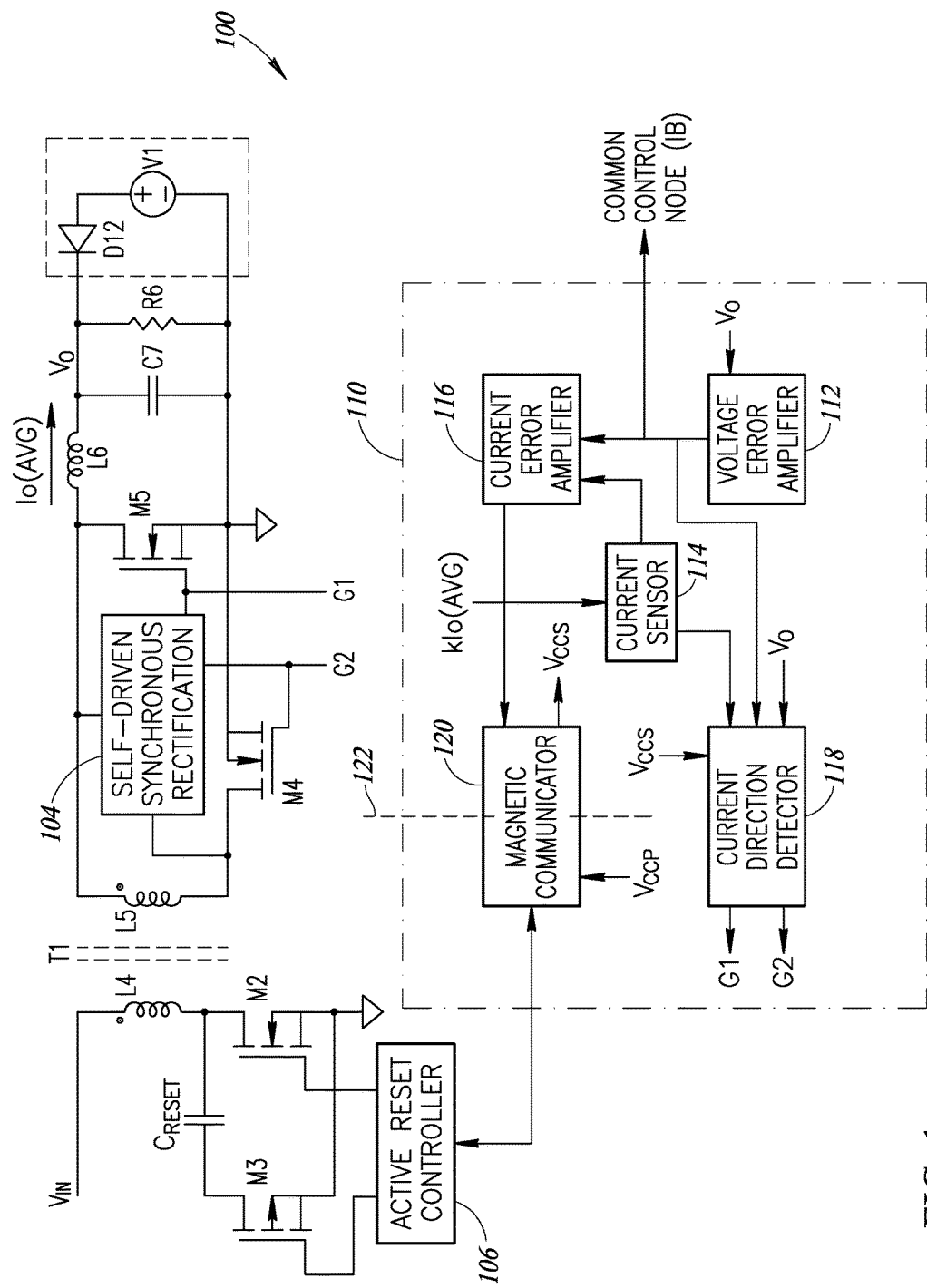
FIG. 1 is a high level schematic diagram of a power converter which includes an average current mode control controller, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure provide discrete implementations of power converter controllers which utilize average current mode control (ACMC) with pre-bias startup and current sharing capabilities for power converters which utilize an active reset scheme and self-driven synchronous rectification (SDSR). One or more implementations discussed herein solve or improve inherent issues with SDSR including, but not limited to, pre-bias startup, current sharing and redundancy capabilities. Inherent to SDSR is an oscillation that occurs on the synchronous MOSFETs during shutdown, which is not a desirable behavior. Without a control method as discussed herein, an externally applied output voltage may turn-on the synchronous rectifiers causing the power converter to sink current instead of sourcing current. One or more implementations discussed herein solve one or more issues with SDSR power converters utilizing a relatively few number of discrete components. Such implementations of the present disclosure may be ideal for hybrid applications, especially for applications where radiation tolerance and minimal part counts are important for high power density.

More particularly, the systems and methods discussed herein may allow one or more power converters to start up into regulation with an external voltage source already applied to its output terminal. As noted above, this feature may be referred to as pre-bias startup. Further, multiple power converters may be connected in parallel to deliver more power to a load than is possible with a single power converter. As discussed further below, this current sharing feature may be performed by connecting the output terminals of multiple power converters together and connecting respective "current sharing" or "common control" nodes of the power converters together. Such feature may also provide redundancy in the event of failure of one or more of the multiple power converters and/or failure of one or more power sources to which the one or more power converters are connected.

Figure 2A:
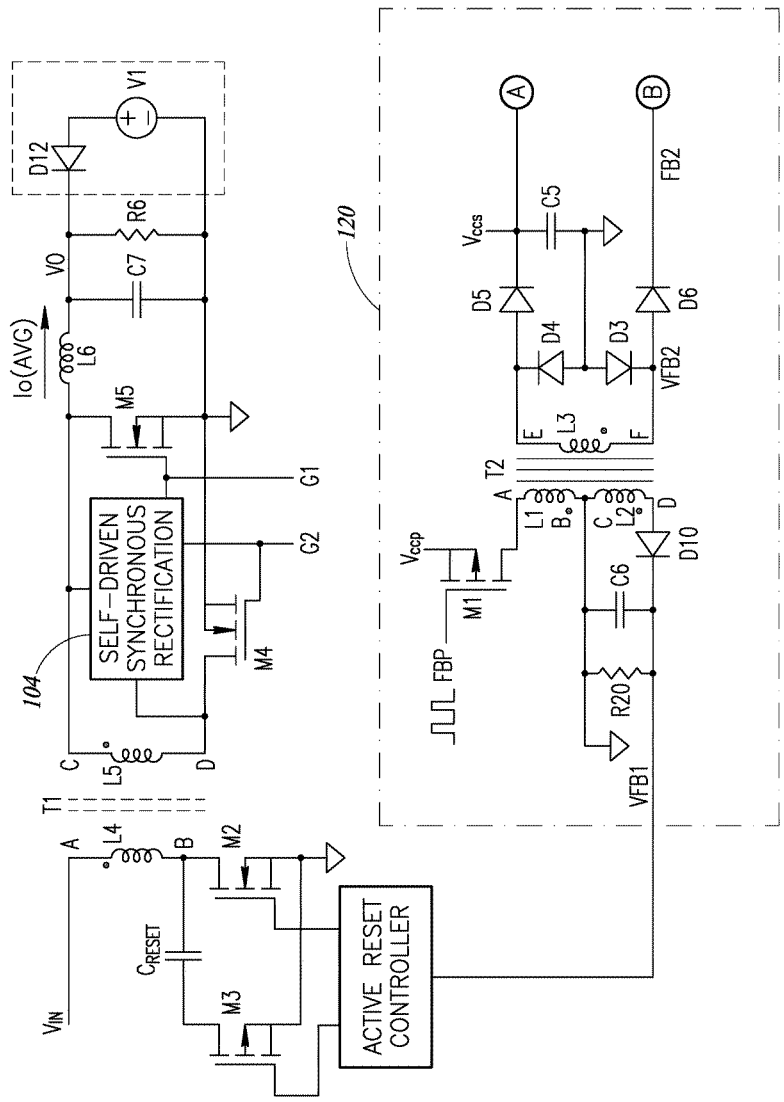
FIGS. 2A-2B are a low level schematic diagram of a power converter which includes an average current mode control controller, according to one illustrated implementation.
Figure 2B:
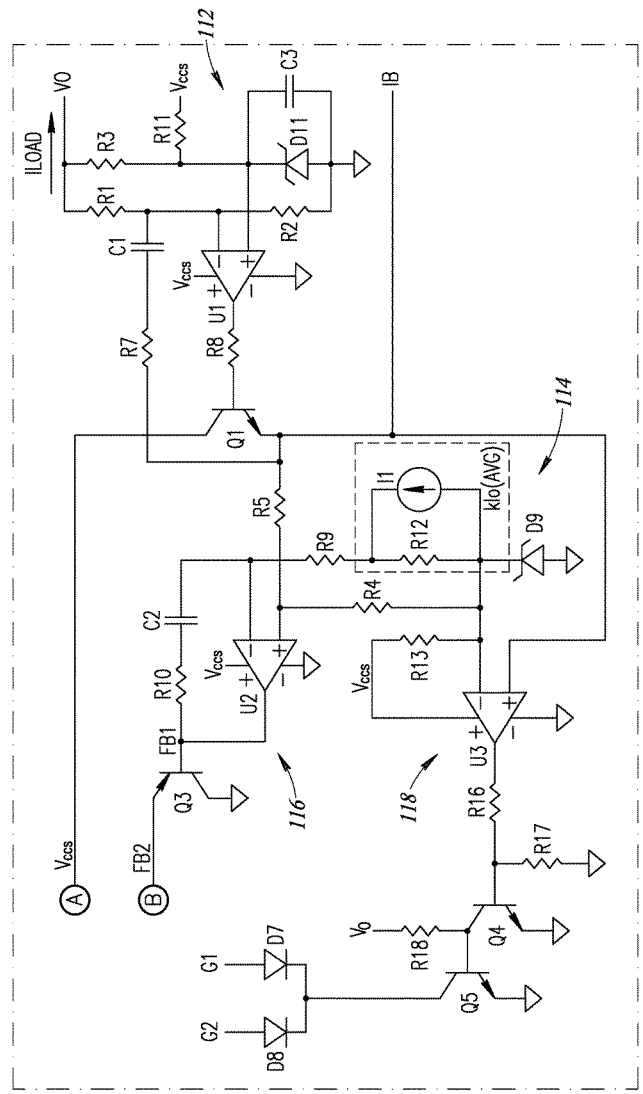

FIG. 1 shows a high level schematic diagram of a power converter 100. FIGS. 2A-2B show a lower level schematic diagram of the power converter 100. In the illustrated example, the power converter 100 is in the form of a forward converter which includes synchronous rectifiers M4 and M5. In this example, a DC voltage input $V_{IN}$ is connected to a primary winding L4 of a transformer T1 by a MOSFET power switch M2. A clamp circuit arrangement is also provided to limit the reset voltage. In particular, the MOSFET power switch M2 is shunted by a series connection of a clamp capacitor $C_{RESET}$ and a MOSFET switch device M3. The conducting intervals of switches M2 and M3 are mutually exclusive. The voltage inertia of the capacitor $C_{RESET}$ limits the amplitude of the reset voltage appearing across the magnetizing inductance during the non-conducting interval of the MOSFET power switch M2.

A secondary winding L5 of the transformer T1 is connected to an output node $V_O$ through a synchronous rectifier including MOSFET rectifying devices M4 and M5. Each rectifying device M4 and M5 includes a body diode. With the power switch M2 conducting, the input voltage $V_{IN}$ is applied across the primary winding L4. The secondary winding L5 is oriented in polarity to respond to the primary voltage with a current flow through an output inductor L6, through a load R6 connected to the output node $V_O$, and back through the MOSFET rectifier device M4 to the secondary winding L5. Continuity of the current flow in the output inductor L6 when the power switch M2 is non-conducting is maintained by the current path provided by the conduction of the MOSFET rectifier device M5. An output filter capacitor C7 shunts the output of the power converter 100.

Conductivity of the two rectifier devices M4 and M5 is controlled by SDSR logic 104 which may optionally receive signals by a primary active-reset pulse-width modulated (PWM) controller 106. The active-reset controller 106 may include, for example, one or more oscillators, comparators, and/or flip-flops. The output of the active reset controller 106 may provide a PWM drive signal to the main switch M2 and the auxiliary switch M3.

The power converter 100 may also include an ACMC controller 110 which operates to control the power converter utilizing average current mode control. Generally, current mode control is a two-loop system which includes an outer voltage control loop and an inner current control loop.

Compared to ACMC which is implemented in the present disclosure, peak current control mode has some deficiencies. In particular, peak current control mode operates by directly comparing the output inductor current waveform to a current program level, set by the outer voltage loop, at two inputs of a PWM comparator. The inner current control loop has a low gain and thus cannot correct for some deficiencies, including poor noise immunity, requirement for slope compensation, and peak-to-average current error.

To remedy some performance issues with peak current mode control, ACMC is used in the implementations of the present disclosure. ACMC overcomes some or all of these deficiencies by providing a high gain integrating current error amplifier into the inner current control loop. Generally, a current error signal is amplified and compared to a relatively large oscillator ramp (e.g., sawtooth) at the inputs of a PWM comparator provided by the active reset controller 106.

As shown in FIG. 1, the ACMC controller 110 includes five primary functional blocks. Such functional blocks include a voltage error amplifier 112, a current sensor 114, a current error amplifier 116, a current direction detector 118, and a magnetic communicator 120. Each of these functional blocks is discussed below.

The voltage error amplifier 112 receives the output voltage $V_O$ of the power converter 100 as input and controls an outer voltage control loop by comparing the output voltage $V_O$ to a fixed reference voltage. This voltage error signal is fed to the current error amplifier 116.

The current sensor 114 is operative to sense the output current of the power converter 100, and to generate an output signal which is representative of (e.g., proportional to) the output current of the power converter 100. The current sensor 114 may include one or more sensing resistors, current sense transformers, and/or other current sensing circuitry, for example.

The current error amplifier 116 may be an integrating current error amplifier which controls an inner current control loop of the ACMC controller 110. The current error amplifier 116 may compare a signal received from the current sensor 114 to a current program signal supplied by the voltage error amplifier 112.

The current direction detector 118 receives the output signal from the voltage error amplifier 112 which is used to determine the direction of the output current of the power converter 100. The current direction detector 118 primarily functions to detect the direction of the output current $L_{LOAD}$ across the load, which in the schematic diagrams of FIGS. 1 and 2A-2B is represented by a load resistor R6. If the current direction detector 118 determines that the power converter 100 is sinking current, for example, due to an externally applied output voltage, represented in the schematic diagrams as a voltage source V1 coupled to the load resistor R6 via a diode D12, then the current direction detector controls the synchronous MOSFETs M4 and M5 via gate nodes G2 and G1, respectively, to remain off to prevent the power converter from sinking current. In at least some implementations, the current direction detector 118 detects a negative current when (1) the power converter 100 is inhibited to prevent the converter output from shorting the load, or (2) during shutdown when power can be passed from the secondary-side to the primary-side causing a negative current for the voltage error amplifier 112 such that the voltage at the inverting pin is greater than the voltage of the non-inverting pin, which causes the output of the voltage error amplifier to go to zero, which in turn causes the output of the current direction detector to go to zero.

The voltage source V1 is representative of a source of voltage, such as another power converter coupled in parallel to the power converter 100, etc. As discussed further below, this feature allows for pre-bias startup and output current sharing. In at least one implementation, during a power loss the current direction detector 118 utilizes the output voltage $V_O$ to turn off the MOSFETs M4 and M5, which advantageously functions to preserve the output voltage $V_O$ by preventing the power converter 100 from sinking current which would otherwise discharge the output capacitor C7 and may cause undesirable behavior or damage to the power converter 100.

The magnetic communicator 120 provides multiple bidirectional functions. First, the magnetic communicator 120 provides isolated transformer-coupled magnetic feedback to the active reset controller 106. Generally, the magnetic communicator 120 employs a transformer, a modulator, and a demodulator to allow optimization of a feedback path which provides an isolation barrier 122 between an input side and an output side of the power converter 100. Second, the magnetic communicator 120 receives a primary side voltage supply $V_{CCP}$ and provides a secondary side voltage supply $V_{CCS}$ which may be used by one or more components of the voltage error amplifier 112, the current sensor 114, the current error amplifier 116 or the current direction detector 118. Third, the magnetic communicator 120 provides an input to the current direction detector 118 supply input (i.e., $V_{CCS}$). When the secondary supply voltage $V_{CCS}$ disappears due to a power loss (e.g., shutdown), the current direction detector 118 keeps the gate signals G1 and G2 low, which turns off the synchronous MOSFETs M4 and M5 to prevent them from conducting current.

FIGS. 2A and 2B show various components of the ACMC controller 110 of the power converter 100, according to one illustrated implementation. Referring to FIG. 2B, the voltage error amplifier 112 comprises an operational amplifier ("op amp") U1 which is powered by the secondary side voltage supply $V_{CCS}$ provided by the magnetic communicator 120. In addition to the op amp U1, the voltage error amplifier 112 includes resistors R1, R2, R3, R7 and R8, capacitors C1 and C3, and Zener diode D11. Generally, the voltage error amplifier 112 controls the outer voltage control loop using the op amp U1 by comparing the output voltage $V_O$ of the power converter 100 to a fixed reference voltage set by a Zener diode D11. This error signal is fed to a buffer Q1 via the resistor R8 to the non-inverting input of an op amp U2 of the current error amplifier 116 through a resistor R5. The error signal is also fed to the non-inverting input of a comparator U3 of the current direction detector 118, as discussed further below.

The current error amplifier 116 includes the op amp U2, resistors R4, R9, R10, and a capacitor C2. The op amp U2 may be powered by the secondary side voltage supply $V_{CCS}$ provided by the magnetic communicator 120. An output node FB1 of the current error amplifier 116 is provided to the magnetic communicator 120, as discussed further below. To achieve average current control, the inner current loop is controlled by the op amp U2. The output of the op amp U1 of the voltage error amplifier 112 is compared to a current sense signal from the current sensor 114 which comprises a current source I1, a resistor R12 and a Zener diode D9. The current source I1 is not literal. Rather, the current source I1 represents the transducing of the average current of the output inductor L6 to a representative voltage conversion using R12.

Referring to FIG. 2A, the magnetic communicator 120 may utilize "flyback sampling" to provide continuous monitoring of the average current error signal provided by the output node FB1 of the op amp U2 of the current error amplifier 116. The magnetic communicator 120 includes a coupling transformer T2 which has primary side windings L1 and L2 and a secondary side winding L3. The winding L1 is between nodes T2A and T2B, the winding L2 is between nodes T2C and T2D, and the winding L3 is between nodes T2E and T2F. The turns ratio for the windings L1, L2, and L3 may be any turns ratio suitable for a particular application, for example, 1:1:1, 1:1:2, etc. A fixed frequency pulse signal may be provided at a sampling switch control node FBP which is coupled to a gate node of a switch M1. The switch M1 may be any type of suitable switch (e.g., MOSFET).

When the switch M1 is turned on, the winding L1 of the transformer T2 is coupled to a primary side voltage supply $V_{CCP}$. This causes a magnetizing energy to build up in the transformer T2. At this time, the voltage across nodes T2C-D of winding L2 is negative at the anode of a diode D10 so the diode D10 is not conducting. A diode D6 prevents the voltage $V_{CCP}$ from appearing at the secondary side of T2 and interfering with the current error amplifier 116. When the switch M1 is turned on, the $V_{CCP}$ voltage is transferred from T2A-B to T2E-F, which is then peak-charged into the capacitor C5 by diodes D5 and D3 to supply the secondary side voltage supply $V_{CCS}$ for the op amp U2 of the current error amplifier 116 and the op amp U1 of the voltage error amplifier 112.

When the switch M1 is turned off, the magnetizing energy stored in the transformer T2 returns in the form of a flyback voltage. That voltage is clamped by error signal FB2 via diodes D6 and D4. The current error amplifier 116 has a low impedance provided by an emitter follower buffer Q3. During the flyback time, the error signal FB2 is fed back to the primary side of the transformer T2 by the voltage reflected across nodes T2C and T2D which is then peak-charged into the capacitor C6 through the diode D10 to form the primary-side feedback signal VFB1 for the active reset controller 106. The conditioned load voltage VFB2 is equal to the voltage at the node FB2 plus the forward diode drop of the diode D6. A resistor R20 may be provided to control the discharge rate of the capacitor C6.

As discussed above, the current direction detector 118 functions to determine whether the output current $I_{LOAD}$ flows into or out of the power converter 100. The current direction detector 118 in this example includes a comparator U3, the Zener diode D9, resistors R13, R16, R17, and R18, diodes D7 and D8, and switches Q4 and Q5. As discussed above, the current source I1 provides a signal which is representative of the average load current LOAD. The current source I1 may comprise a current transformer on the primary power transformer T1, a current sensing resistor, etc.

In operation, the current direction detector 118 turns off the synchronous MOSFETs M4 and M5 when it is determined that current is flowing into the power converter 100 rather than out of the power converter. This may be achieved by directing the synchronous rectification MOSFETs M4 and M5 to remain off by turning the switch Q4 off and turning the switch Q5 on. In particular, when a "negative current" (i.e., into the power converter 100) is detected by the comparator U3, the gate signals G1 and G2 are pulled to ground through conduction of the diodes D7 and D8 to prevent the synchronous MOSFETs M4 and M5 from conducting current. This occurs when the switch Q5 is on, the switch Q4 is off, and the output of the comparator U3 is low (i.e., 0 V). For the output of the comparator U3 to be low, the positive input of the comparator U3 must be less than the negative input of the comparator U3. The negative input of the comparator U3 is a fixed positive voltage formed by the Zener diode D9.

As shown in FIG. 2B, the base of the switch Q5 is coupled to the output node $V_O$ through the resistor R18. When the output of the comparator U3 is low, the switch Q4 is turned off which causes the switch Q5 to be turned on due to the voltage provided by the output voltage $V_O$. When the switch Q5 is turned on, current flows through the diodes D7 and D8 which keeps the gate signals G1 and G2 low, thereby keeping the synchronous MOSFETs M4 and M5 turned off. Thus, during a power loss, the current direction detector 118 utilizes the output voltage $V_O$ to turn off the MOSFETs M4 and M5, which advantageously functions to preserve the output voltage $V_O$ by preventing the power converter 100 from sinking current which would otherwise rapidly discharge the output capacitor C7. This feature is accomplished without requiring any input voltage $V_{IN}$.

Thus, the synchronous MOSFETs M4 and M5 are kept turned off when the output voltage $V_O$ is greater than the base-emitter voltage (Vbe) of the switch Q5 due to an external source (e.g., source V1) and the output of the comparator U3 is low, which indicates a negative or reverse current into the power converter 100. The synchronous MOSFETs are also kept turned off when the secondary side supply voltage $V_{CCS}$ is low (e.g., due to loss of power).

As briefly discussed above, in one or more implementations the magnetic communicator 120 provides at least three functions. First, the magnetic communicator 120 provides the secondary side voltage supply $V_{CCS}$ when the switch M1 is turned on. Second, the magnetic communicator 120 provides isolated magnetic feedback from the secondary side to the primary side during the portion of the cycle when the switch M1 is turned off. Third, the magnetic communicator 120 provides the secondary side voltage supply $V_{CCS}$ to the comparator U3 of the current direction detector 118. When the secondary side supply voltage $V_{CCS}$ is lost (e.g., shutdown, inhibit), the output of the comparator U3 goes low, which turns the switch Q4 off and turns the switch Q5 on. As discussed above, this feature keeps the gate nodes G1 and G2 of the synchronous MOSFETs M5 and M4, respectively, low, which keeps the MOSFETs M4 and M5 turned off to prevent current from flowing into the power converter 100.

As noted above, inherent to SDSR is an oscillation on the synchronous MOSFETs (e.g., MOSFETs M4 and M5) that occurs during shutdown. The implementations discussed herein prevent this behavior by removing the secondary voltage $V_{CCS}$ from the comparator U3 of the current direction detector 118 when the switch M1 turns off. This event causes the switch Q4 to turn off and the switch Q5 to turn on, thereby keeping the gate nodes G1 and G2 clamped to ground plus a diode forward voltage drop of diodes D7 and D8, respectively. As a result, the synchronous MOSFETs M4 and M5 no longer oscillate when the power converter 100 is shut down, and the output capacitor(s) C7 is no longer discharged.

Figure 3:
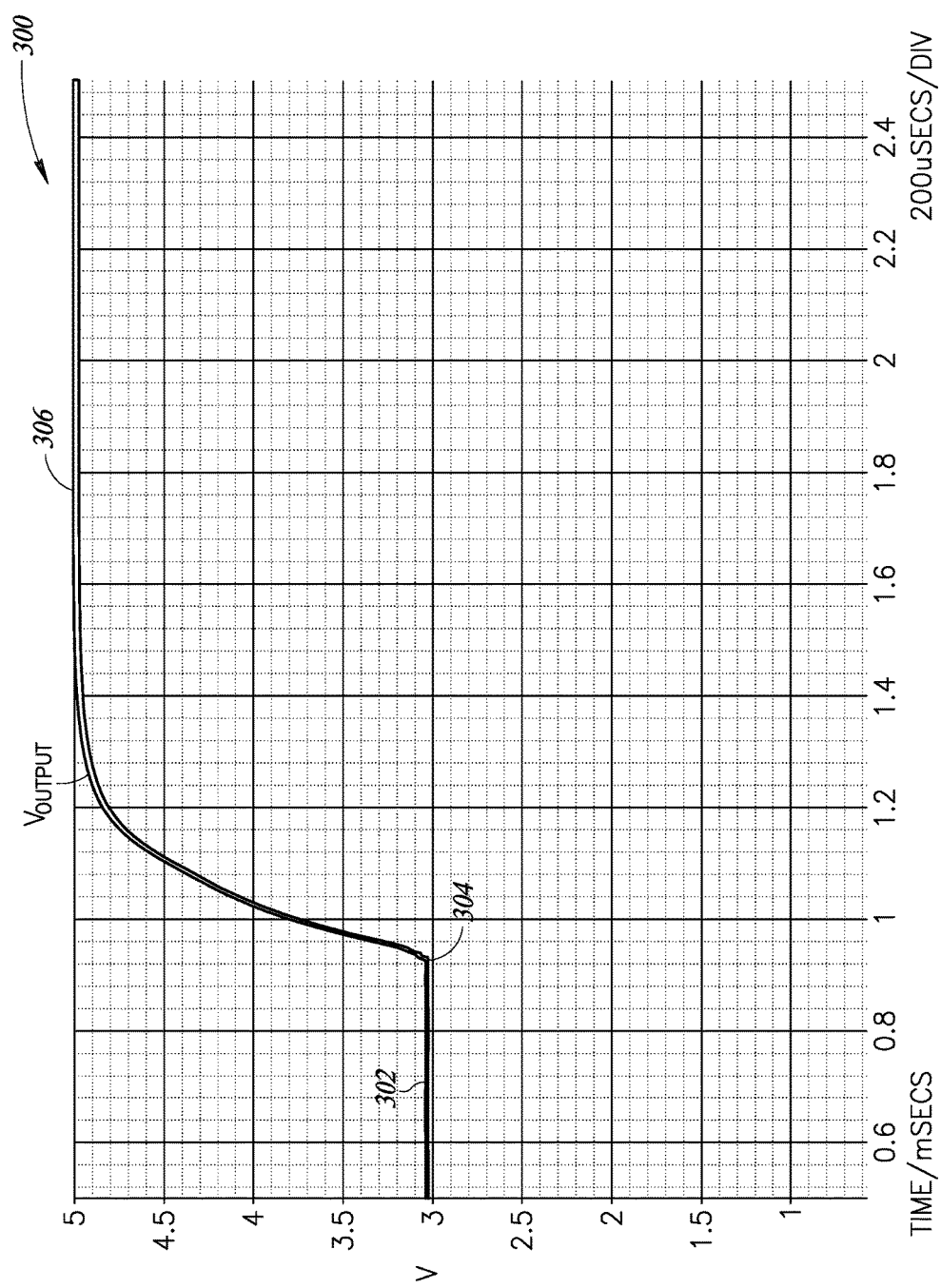
FIG. 3 is a plot of an output voltage node of a power converter during pre-bias startup, according to one illustrated implementation.

FIG. 3 is a plot 300 which shows the output voltage $V_{OUTPUT}$ (or $V_O$) of the power converter 100 during startup with a pre-biased output ("pre-bias startup"). As shown in FIGS. 1 and 2A-2B, the external voltage source V1 is applied to the output node $V_O$ of the power converter 100 via a diode D12. The external voltage source V1 may be representative of a load, one or more other power converters connected in parallel with the power converter, etc. Generally, a startup is successful if the power converter 100 can continue to turn on into regulation when the output voltage $V_O$ starts at the voltage applied by the external voltage source V1. As discussed above, the synchronous MOSFETs M4 and M5 are kept off by the switch Q5 of the current direction detector 118 since the current direction detector detects a negative current.

As shown in FIG. 3, in this example the output voltage $V_{OUTPUT}$ is pre-biased at a point 302 to about 3 V by the external voltage source V1. In practice, the pre-biased voltage may be provided by the load or by one or more additional power converters. As shown, the power converter 100 starts up at a point 304, where the circuitry is activated, and continues until point 306 where the output voltage $V_O$ is regulated at 5 V.

Figure 4:
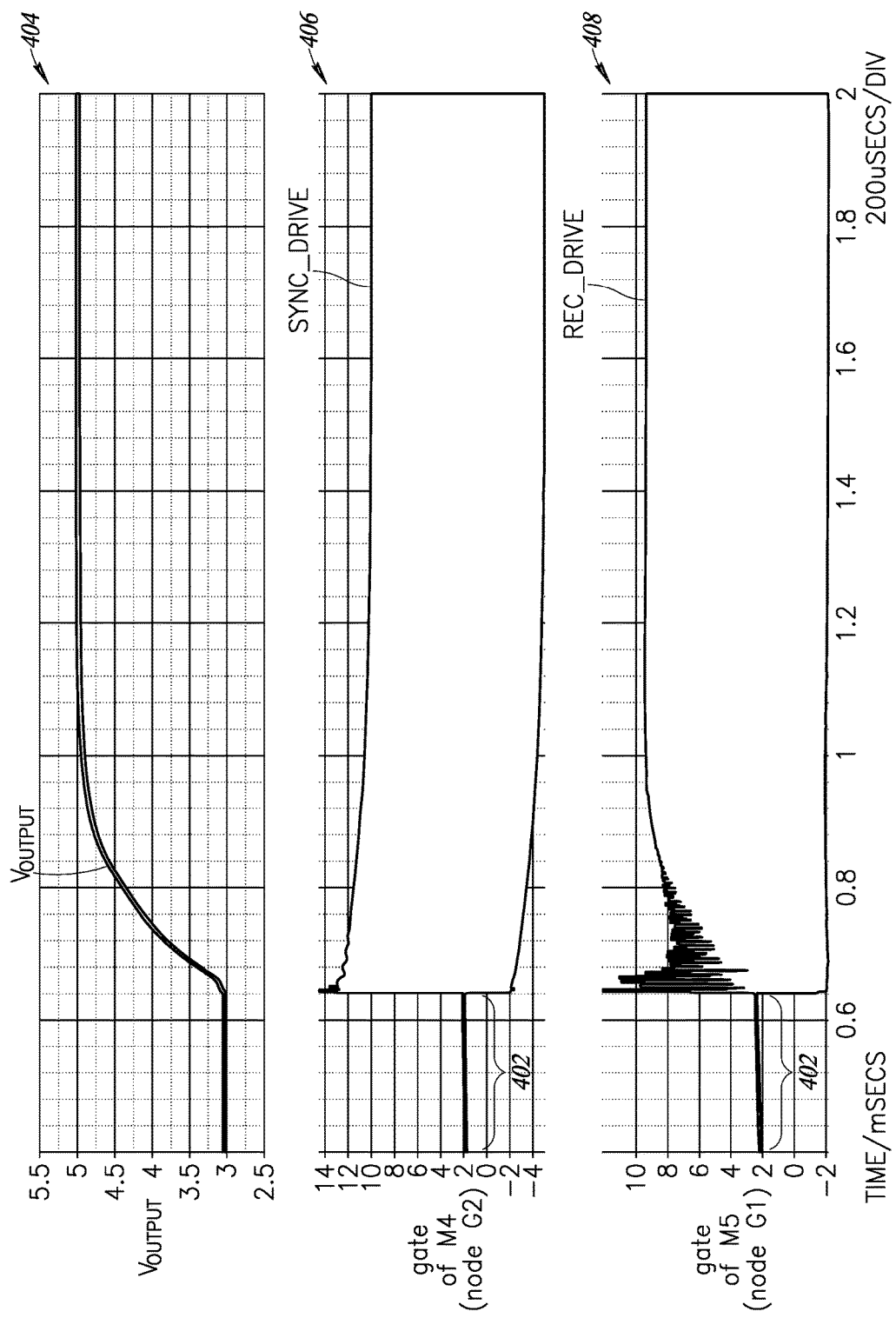
FIG. 4 is a plot of an output voltage node of a power converter and gate nodes of synchronous rectifiers of the power converter during pre-bias startup, according to one illustrated implementation.

FIG. 4 shows plots 404, 406 and 408. Plot 404 shows the output voltage $V_{OUTPUT}$, the plot 406 shows the voltage at the gate of the switch M4 (node G2), and the plot 408 shows the voltage at the gate of the switch M5 (node G1). As shown, the gate nodes G1 and G2 are at a fixed voltage (e.g., 2 V) during an initial startup period 402 (e.g., 0 to 650 μs) due to the gate nodes G1 and G2 being kept off by the switch Q5, as discussed above. After the initial startup period 402, gate nodes G1 and G2 controlled normally by the self-driven synchronous rectification circuitry or logic 104.

Figure 5:
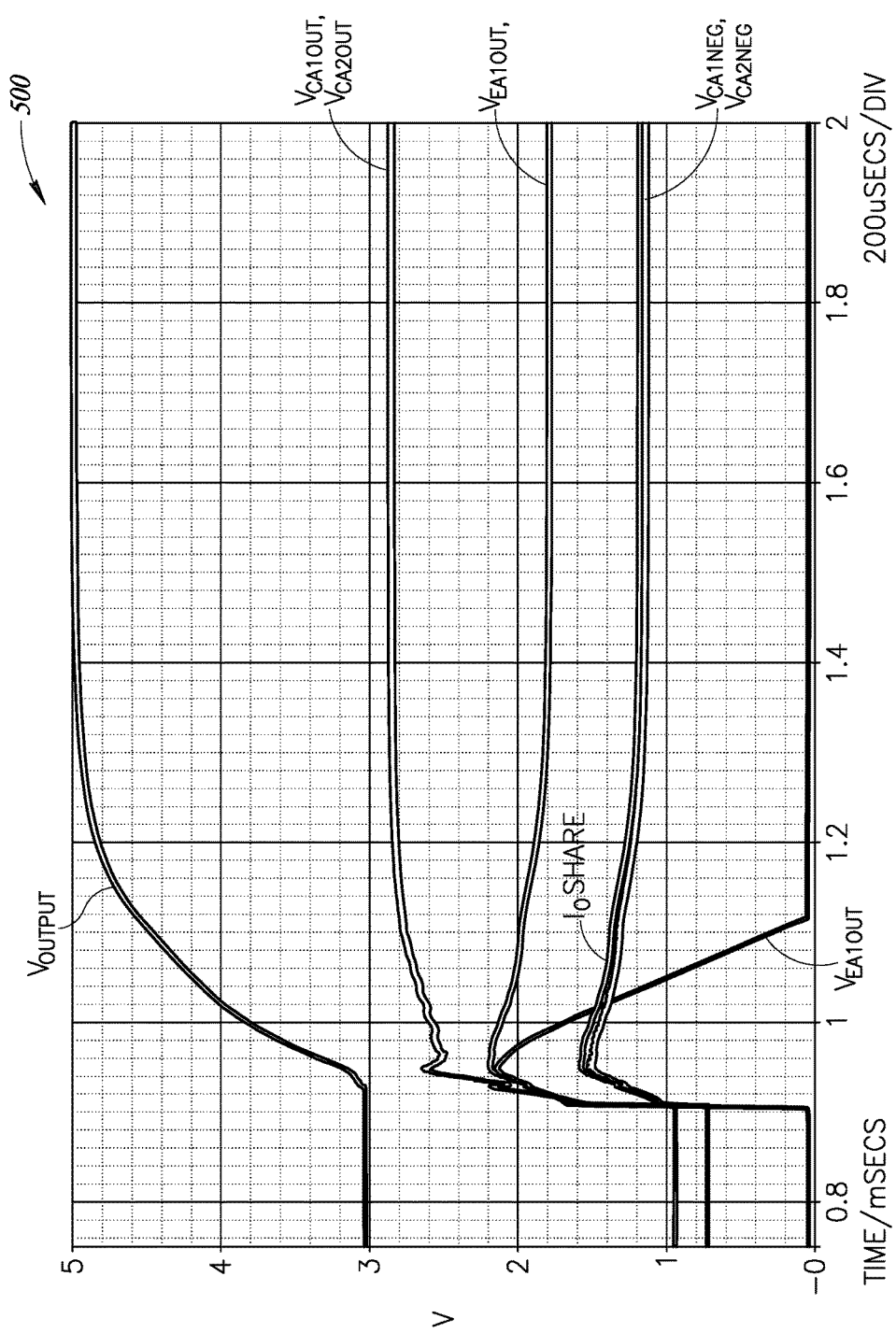
FIG. 5 is a plot which shows a current sharing and pre-bias startup operation for two power converters, according to one illustrated implementation.
Figure 7:
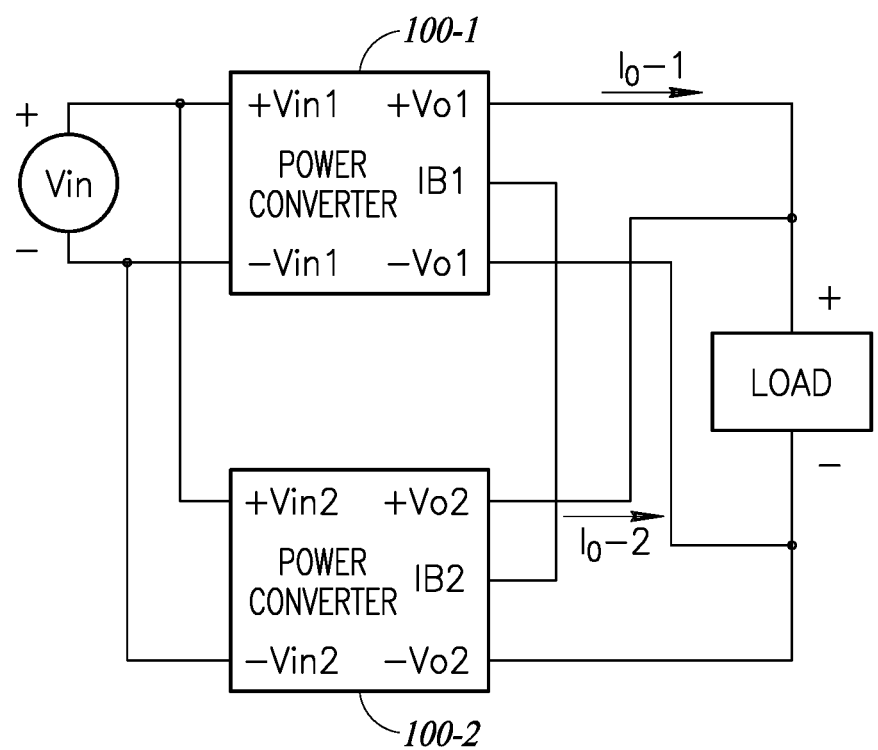
FIG. 7 is a schematic diagram of two power converters connected together in parallel, according to one illustrated implementation.

FIG. 5 is a plot 500 which shows the current sharing and pre-bias startup operation for two power converters (e.g., two instances of power converter 100) connected together in parallel. FIG. 7 shows a schematic diagram for two power converters 100-1 and 100-2 which are coupled together in parallel. Specifically, the positive inputs +Vin1 and +Vin2 of the power converters 100-1 and 100-2, respectively, are coupled together and coupled to a positive terminal of an input source Vin, and the negative inputs −Vin1 and −Vin2 of the power converters 100-1 and 100-2, respectively, are coupled together and coupled to a negative terminal of the input source Vin. The outputs $+V_{O1}$ and $+V_{O2}$ of the power converters 100-1 and 100-2, respectively, are coupled together and are coupled to a positive node of a load. Similarly, the outputs $-V_{O1}$ and $-V_{O2}$ of the power converters 100-1 and 100-2, respectively, are coupled together and are coupled to a negative node of the load. Additionally, the "current sharing" or "common control" nodes IB1 and IB2 of the power converters 100-1 and 100-2, respectively, are coupled together. Although only two converters 100-1 and 100-2 are shown for explanatory purposes, it should be appreciated that in practice numerous power converters may be coupled together in parallel depending on the needs of a particular application.

Referring back to FIG. 5, in this example, the output voltage $V_{OUTPUT}$ is pre-biased to a voltage of approximately 3 V by an external source. As shown, the output voltage $V_{OUTPUT}$ starts at 3 V and starts to rise at about 920 μs until the output voltage reaches regulation of 5 V at about 1.4 ms.

In the plot 500 of FIG. 5, a signal $V_{ca1out}$, $V_{ca2out}$ represents the output signal of the op amp U2 of the current error amplifier 116 for each of the two parallel-connected power converters 100-1 and 100-2. A signal $V_{ca1neg}$, $V_{ca2neg}$ represents the voltage at the inverting input of the op amp U2 of the current error amplifier 116 for each of the two parallel-connected power converters 100-1 and 100-2. Signal $V_{ea1out}$ and $V_{ea2out}$ represent an output voltage of the op amp U1 of the voltage error amplifier 112 through the resistor R8 for each of the two parallel-connected power converters 100-1 and 100-2. A signal Vca1out, Vca2out represents the voltage at the output of the op amp U2 of the current error amplifier 116 for each of the two parallel-connected power converters 100-1 and 100-2. A signal IoShare represents the voltage of the current sharing or common control nodes IB1 and IB2 (see FIG. 7), which, as shown in FIG. 2B, is also the signal applied to the non-inverting input of the comparator U3 of the current direction detector 118 and the signal applied to the non-inverting input of the op amp U2 of the current error amplifier 116 through the resistor R5.

As discussed above, the output signals $V_{ca1out}$, $V_{ca2out}$ of the two current error amplifiers U2 are also the feedback signals for the respective converters 100-1 and 100-2. The waveforms shown in the plot 500 of FIG. 5 demonstrate that the error amplifiers U1 and U2 for the two power converters 100-1 and 100-2 are in control.

Figure 6:
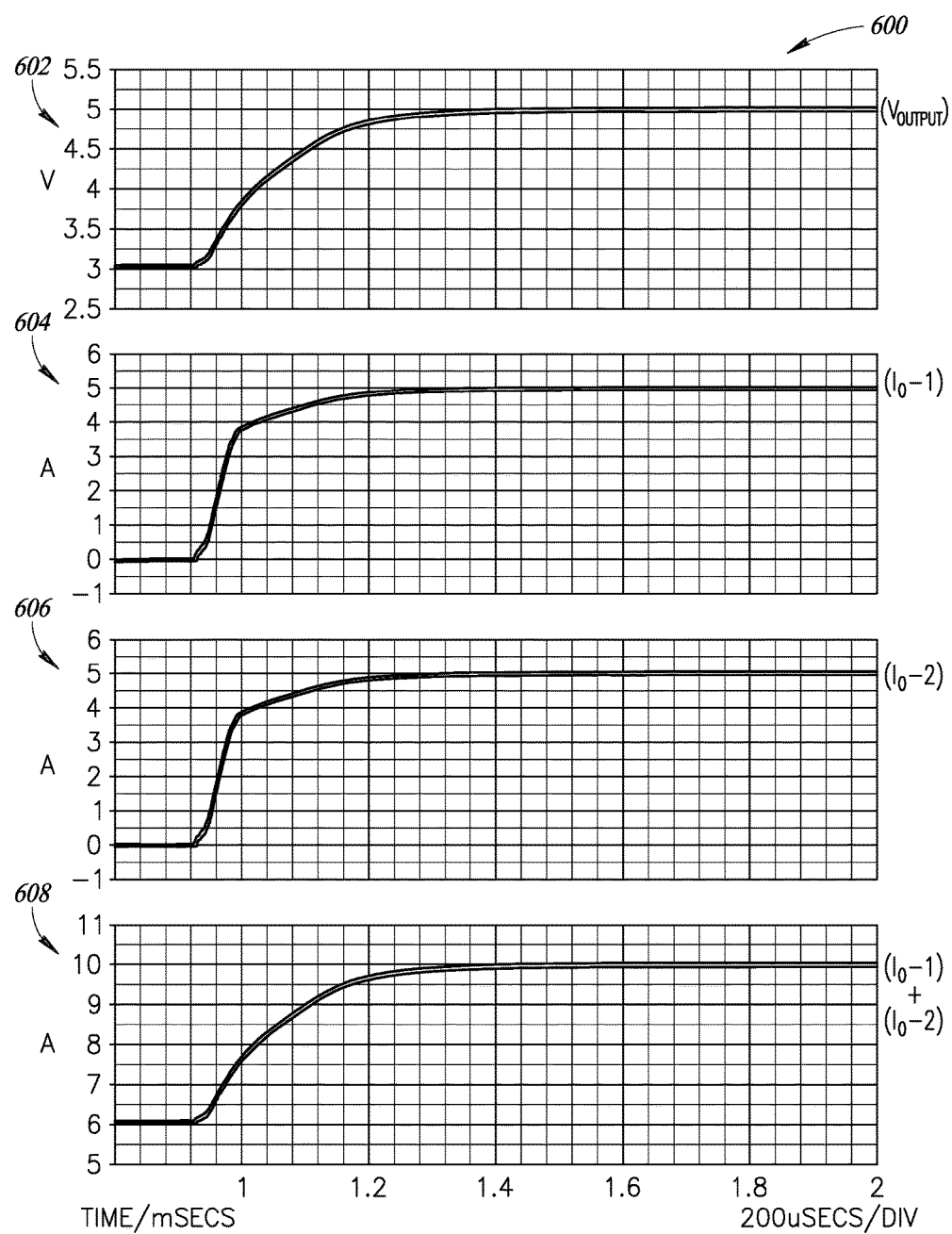
FIG. 6 is a plot which shows an average current through the output inductors of a first power converter and a second power converter which are connected in parallel for current sharing, according to one illustrated implementation.

FIG. 6 shows a diagram 600 which includes four plots 602, 604, 606 and 608. The plot 602 shows the output voltage $V_{OUTPUT}$ of the two converters 100-1 and 100-2 connected in parallel. The plot 604 shows the average load current ($I_O$-1) through the output inductor L6 (FIG. 1) of the first power converter 100-1. The plot 606 shows the average load current ($I_O$-2) through the output inductor L6 of the second power converter 100-2. The plot 608 shows the combined average load current (i.e., sum of $I_O$-1 and $I_O$-2) through the output inductors L6 (FIG. 1) of the first power converter 100-1 and the second power converter 100-2 which are connected in parallel for current sharing as shown in FIG. 7. As shown, the output inductor L6 for each of the power converters 100-1 and 100-2 carries an average of 5 A (plots 604 and 606) for a total of 10 A (plot 608) shared equally between the two converters.

As discussed above, the implementations discussed herein provide several advantages. The implementations provide improved line and load transient responses, which allows such to be used in power converters with excellent stability and fast response. Further, the implementations discussed herein provide current sharing capabilities with a single-control node by connecting multiple converters together via the common control node IB, as shown in FIGS. 2B and 7. When in current sharing operation, the "master" power converter in a group of two or more power converters is automatically determined by the power converter having the highest output voltage $V_O$. If the master power converter is non-functional, then the next master power converter is determined automatically, and so on. Further, the current sharing signal is provided for "free," since all paralleled converters are connect together with a single connection (e.g., wire). The dynamic performance of the paralleled converters is the same as a single-converter since there's only one single-loop control at any given time.

One or more implementations discussed herein also provide minimal part counts, which is beneficial for hybrid or other applications, and also provide enhanced radiation tolerance at low costs due to the use of discrete components. As discussed above, the implementations discussed herein prevent the synchronous MOSFETs M4 and M5 from oscillating during shutdown. Further, the state of the average current in the output inductor L6 is used for multiple functions (e.g., detecting output current direction, setting current limit).

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). Those of skill in the art will recognize that many of the methods or algorithms set out herein may employ additional acts, may omit some acts, and/or may execute acts in a different order than specified.

The various implementations described above can be combined to provide further implementations. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An average current mode control (ACMC) controller for a power converter, the power converter comprising a power transformer having a primary winding electrically coupleable to an input voltage node and a secondary winding electrically coupleable to an output voltage node, a primary control circuit electrically coupled to the primary winding, a secondary control circuit electrically coupled to the secondary winding, the secondary control circuit comprising first and second synchronous rectifying elements comprising respective first and second control nodes, the average current mode control (ACMC) controller comprising:
   a magnetic communicator circuit comprising:
      a selectively controllable switch; and
      a coupling transformer comprising a first primary winding, a second primary winding, and a secondary winding, the secondary winding electrically coupled to a secondary side DC voltage supply circuit comprising a DC supply rectifier and a DC supply capacitor which provides a secondary side DC voltage supply on the DC supply capacitor of the secondary side DC voltage supply circuit, the first and second primary windings selectively coupled to a primary side DC voltage supply via the controllable switch whereby the secondary side DC voltage supply is developed on the DC supply capacitor of the secondary side DC voltage supply circuit by selectively controlling the controllable switch into conduction, the secondary winding electrically coupled to a secondary side feedback signal node, and the second primary winding electrically coupled to a sampling circuit comprising a sampling rectifier and a sampling capacitor whereby a secondary side feedback signal at the secondary side feedback signal node is transferred to the second primary winding by the selective controlling of the controllable switch into conduction, whereby a primary side feedback voltage is developed on the sampling capacitor of the sampling circuit by the selective controlling of the controllable switch into conduction, the primary side feedback voltage electrically coupleable to the primary control circuit of the power converter.

2. The average current mode control (ACMC) controller of claim 1, further comprising:
   a voltage error amplifier circuit comprising an input node and an output node, the input node electrically coupled to the output voltage node of the power converter; and
   a current error amplifier circuit comprising an input node and an output node, the input node of the current error amplifier circuit electrically coupled to the output node of the voltage error amplifier circuit, and the output node of the current error amplifier electrically coupled to the secondary side feedback signal node.

3. The average current mode control (ACMC) controller of claim 2 wherein the voltage error amplifier circuit comprises an operational amplifier which includes a supply input node electrically coupled to the secondary side DC voltage supply to receive power therefrom.

4. The average current mode control (ACMC) controller of claim 2 wherein the current error amplifier circuit comprises an operational amplifier which includes a supply input node electrically coupled to the secondary side DC voltage supply to receive power therefrom.

5. The average current mode control (ACMC) controller of claim 2, further comprising:
   a common control node which is representative of an output signal of the voltage error amplifier circuit, the common control node coupleable to a common control node of another power converter to provide current sharing operation between the power converter and the other power converter.

6. The average current mode control (ACMC) controller of claim 1, further comprising:
   a current direction detector circuit operatively coupled to sense a direction of an output current of the power converter and, responsive to detecting output current flows into the power converter, the current direction detector circuit causes the first and second control nodes of the respective first and second synchronous rectifying elements to control the first and second synchronous rectifying elements to be in an non-conduction state.

7. The average current mode control (ACMC) controller of claim 6 wherein the current direction detector circuit comprises a comparator which includes a supply input node electrically coupled to the secondary side DC voltage supply to receive power therefrom.

8. The average current mode control (ACMC) controller of claim 6 wherein the current direction detector circuit comprises a control switch electrically coupled to each of the first and second control nodes of the respective first and second synchronous rectifying elements, the control switch comprising a control switch control node electrically coupled to the output voltage node of the power converter.

9. The average current mode control (ACMC) controller of claim 6 wherein the current direction detector comprises a control switch electrically coupled to each of the first and second control nodes of the respective first and second synchronous rectifying elements via respective first and second diodes, the control switch comprising a control switch control node electrically coupled to the output voltage node of the power converter via a resistor.

10. An active-clamp forward converter, comprising:
   a transformer having a primary winding and a secondary winding, the secondary winding electrically coupleable to an output voltage node;
   a primary control circuit electrically coupled to the primary winding, the primary winding electrically coupleable to an input voltage node;
   a secondary control circuit electrically coupled to the secondary winding, the secondary control circuit comprising first and second synchronous rectifying elements comprising respective first and second control nodes; and
   an average current mode control (ACMC) converter, comprising:
      a magnetic communicator circuit comprising:
         a selectively controllable switch; and
         a coupling transformer comprising a first primary winding, a second primary winding, and a secondary winding, the secondary winding electrically coupled to a secondary side DC voltage supply circuit comprising a DC supply rectifier and a DC supply capacitor which provides a secondary side DC voltage supply on the DC supply capacitor of the secondary side DC voltage supply circuit, the first and second primary windings selectively coupled to a primary side DC voltage supply via the controllable switch whereby the secondary side DC voltage supply is developed on the DC supply capacitor of the secondary side DC voltage supply circuit by selectively controlling the controllable switch into conduction, the secondary winding electrically coupled to a secondary side feedback signal node, and the second primary winding electrically coupled to a sampling circuit comprising a sampling rectifier and a sampling capacitor whereby a secondary side feedback signal at the secondary side feedback signal node is transferred to the second primary winding by the selective controlling of the controllable switch into conduction, whereby a primary side feedback voltage is developed on the sampling capacitor of the sampling circuit by the selective controlling of the controllable switch into conduction, the primary side feedback voltage electrically coupleable to the primary control circuit of the active-clamp forward converter.

11. The active-clamp forward converter of claim 10, further comprising:
a voltage error amplifier circuit comprising an input node and an output node, the input node electrically coupled to the output voltage node of the active-clamp forward converter; and
a current error amplifier circuit comprising an input node and an output node, the input node of the current error amplifier electrically coupled to the output node of the voltage error amplifier circuit, and the output node of the current error amplifier electrically coupled to the secondary side feedback signal node.

12. The active-clamp forward converter of claim 11 wherein the voltage error amplifier circuit comprises an operational amplifier which includes a supply input node electrically coupled to the secondary side DC voltage supply to receive power therefrom.

13. The active-clamp forward converter of claim 11 wherein the current error amplifier circuit comprises an operational amplifier which includes a supply input node electrically coupled to the secondary side DC voltage supply to receive power therefrom.

14. The active-clamp forward converter of claim 11, further comprising:
a common control node which is representative of an output signal of the voltage error amplifier circuit, the common control node coupleable to a common control node of another active-clamp forward converter to provide current sharing operation between the active-clamp forward converter and the other active-clamp forward converter.

15. The active-clamp forward converter of claim 10, further comprising:
a current direction detector circuit operatively coupled to sense a direction of an output current of the active-clamp forward converter and, responsive to detecting output current flows into the active-clamp forward converter, the current direction detector circuit causes the first and second control nodes of the respective first and second synchronous rectifying elements to control the first and second synchronous rectifying elements to be in an non-conduction state.

16. The active-clamp forward converter of claim 15 wherein the current direction detector circuit comprises a comparator which includes a supply input node electrically coupled to the secondary side DC voltage supply to receive power therefrom.

17. The active-clamp forward converter of claim 15 wherein the current direction detector comprises a control switch electrically coupled to each of the first and second control nodes of the respective first and second synchronous rectifying elements, the control switch comprising a control switch control node electrically coupled to the output voltage node of the active-clamp forward converter.

18. The active-clamp forward converter of claim 15 wherein the current direction detector comprises a control switch electrically coupled to each of the first and second control nodes of the respective first and second synchronous rectifying elements via respective first and second diodes, the control switch comprising a control switch control node electrically coupled to the output voltage node of the active-clamp forward converter via a resistor.

19. An average current mode control (ACMC) controller for a power converter, the power converter comprising a power transformer having a primary winding electrically coupleable to an input voltage node and a secondary winding electrically coupleable to an output voltage node, a primary control circuit electrically coupled to the primary winding, a secondary control circuit electrically coupled to the secondary winding, the secondary control circuit comprising first and second synchronous rectifying elements comprising respective first and second control nodes, the average current mode control (ACMC) controller comprising:
a voltage error amplifier circuit comprising an input node and an output node, the input node electrically coupled to the output voltage node of the power converter;
a current error amplifier circuit comprising an input node and an output node, the input node of the current error amplifier electrically coupled to the output node of the voltage error amplifier circuit, and the output node of the current error amplifier electrically coupled to a secondary side feedback signal node;
a current direction detector circuit operatively coupled to sense a direction of an output current of the power converter and, responsive to detecting output current flows into the power converter, the current direction detector circuit causes the first and second control nodes of the respective first and second synchronous rectifying elements to control the first and second synchronous rectifying elements to be in an non-conduction state; and
a magnetic communicator circuit comprising:
a selectively controllable switch; and
a coupling transformer comprising a first primary winding, a second primary winding, and a secondary winding, the secondary winding electrically coupled to a secondary side DC voltage supply circuit comprising a DC supply rectifier and a DC supply capacitor which provides a secondary side DC voltage supply on the DC supply capacitor of the secondary side DC voltage supply circuit, the first and second primary windings selectively coupled to a primary side DC voltage supply via the controllable switch whereby the secondary side DC voltage supply is developed on the DC supply capacitor of the secondary side DC voltage supply circuit by selectively controlling the controllable switch into conduction, the secondary winding electrically coupled to the secondary side feedback signal node, and the second primary winding electrically coupled to a sampling circuit comprising a sampling rectifier and a sampling capacitor whereby a secondary side feedback signal at the secondary side feedback signal node is transferred to the second primary winding by the selective controlling of the controllable switch into conduction, whereby a primary side feedback voltage is developed on the sampling capacitor of the sampling circuit by the selective controlling of the controllable switch into conduction, the primary side feedback voltage electrically coupleable to the primary control circuit of the power converter.

* * * * *